(12) United States Patent
Geller et al.

(10) Patent No.: US 8,984,405 B1
(45) Date of Patent: Mar. 17, 2015

(54) CATEGORIZED AND TAGGED VIDEO ANNOTATION

(71) Applicant: R3 Collaboratives, Inc., San Francisco, CA (US)

(72) Inventors: Adam Joseph Geller, San Francisco, CA (US); Ross David Weldon, San Francisco, CA (US)

(73) Assignee: R3 Collaboratives, Inc., San Francisco, CA (US)

( * ) Notice: Subject to any disclaimer, the term of this patent is extended or adjusted under 35 U.S.C. 154(b) by 0 days.

(21) Appl. No.: 14/087,144

(22) Filed: Nov. 22, 2013

Related U.S. Application Data

(63) Continuation of application No. 14/015,932, filed on Aug. 30, 2013.

(60) Provisional application No. 61/839,794, filed on Jun. 26, 2013.

(51) Int. Cl.
| | |
|---|---|
| *G06F 3/00* | (2006.01) |
| *G06F 3/0482* | (2013.01) |
| *G06F 3/0481* | (2013.01) |
| *G06F 3/0485* | (2013.01) |
| *G06F 3/01* | (2006.01) |

(52) U.S. Cl.
CPC .......... *G06F 3/0482* (2013.01); *G06F 3/04817* (2013.01); *G06F 3/0485* (2013.01)
USPC ............ 715/719; 715/230; 715/765; 715/753

(58) Field of Classification Search
CPC . H04N 5/44543; G11B 27/034; G06F 3/0482
USPC .................. 715/720, 230, 765, 719, 753, 732
See application file for complete search history.

(56) References Cited

U.S. PATENT DOCUMENTS

| | | | |
|---|---|---|---|
| 2009/0311658 | A1 | 12/2009 | Polivka |
| 2010/0199182 | A1* | 8/2010 | Lanza et al. ................... 715/723 |
| 2010/0319031 | A1* | 12/2010 | Lee et al. ........................ 725/46 |

(Continued)

OTHER PUBLICATIONS

Julia Cornwell, Encouraging higher cognitive thinking in primary school classroom, juliaec.wordpress.com, Mar. 23, 2011, 3 pages.*

*Primary Examiner* — Amy Ng
*Assistant Examiner* — Toan Vu
(74) *Attorney, Agent, or Firm* — Hickman Palermo Truong Becker Bingham Wong LLP

(57) ABSTRACT

In an embodiment, a data processing method comprises a first computer obtaining access to a digitally stored video program and causing playing the video program in a player window of a second computer, wherein the player window includes a linear graphical timeline representing the video program; the first computer receiving from the second computer location input data specifying a point in the video program and determining a time value of the point in the video program; receiving comment type input data indicating a particular comment type among a plurality of available comment types; receiving comment input data; creating and storing, in electronic digital storage coupled to the first computer, a record that associates an identifier of the video program, the time value, the comment type input data, and the comment input data; causing displaying, in the timeline at a position that is proportional to the point, a marker having a particular distinctive appearance from among a plurality of distinctive appearances that correspond respectively to the plurality of available comment types.

21 Claims, 17 Drawing Sheets

(56) References Cited

U.S. PATENT DOCUMENTS

| | | |
|---|---|---|
| 2011/0145885 A1 | 6/2011 | Rivers et al. |
| 2011/0222782 A1* | 9/2011 | Kashiwagi .................... 382/218 |
| 2012/0047421 A1* | 2/2012 | Holman ........................ 715/202 |
| 2012/0089977 A1* | 4/2012 | Park et al. .................... 717/177 |
| 2012/0150698 A1* | 6/2012 | McClements, IV ......... 705/27.2 |
| 2012/0308195 A1* | 12/2012 | Bannan et al. ................ 386/230 |
| 2013/0004138 A1* | 1/2013 | Kilar et al. ................... 386/230 |
| 2013/0031220 A1* | 1/2013 | Moncavage et al. .......... 709/219 |
| 2013/0067312 A1* | 3/2013 | Rose ............................. 715/234 |
| 2013/0097476 A1* | 4/2013 | Kuroda ......................... 715/201 |
| 2013/0132839 A1* | 5/2013 | Berry ............................ 715/719 |
| 2013/0145269 A1* | 6/2013 | Latulipe et al. ............... 715/720 |
| 2013/0212039 A1* | 8/2013 | Burckart et al. .............. 705/347 |
| 2013/0282611 A1* | 10/2013 | Avedissian et al. ........... 705/347 |
| 2014/0013200 A1* | 1/2014 | White ........................... 715/230 |
| 2014/0019882 A1 | 1/2014 | Chew et al. |
| 2014/0089794 A1 | 3/2014 | Huang et al. |

* cited by examiner

FIG. 3A

Tell Us About Your Video
Please fill in all fields now, and be reassured that you can still edit and share later.

300

1. Basic Info   304

TITLE *

Assignment 5   306

DESCRIPTION *

Here is an explanation of the video. This what is happening and these are the questions I have and what do you think I could have said to the student who asked the question at 5:14?   307

308   Continue

* indicates required field

2. Tags   310

3. Supporting Materials   312

4. Share   314

302

Assignment 5
Duration: 15:23

FIG. 3B 310

2. Tags

GRADE *
[Type or select a grade  320 ▼]

Second Grade ×
Early Elementary ×

SUBJECT *
[Type or select a subject  322 ▼]

Arithmetic ×
Addition ×
Simple Math ×

* Indicates required field.

3. Supporting Materials

SUPPORTING FILES 324
Suggested: photo of classroom (JPG) or lesson plan (PDF)

[Select File]   Or Drop Files Here

LINKS
[Enter url here  326]
[Add a friendly name for your url  328]

ASSIGNMENT 5

WHERE THIS VIDEO IS BEING DISCUSSED — 902

| GROUP | FRAMEWORK | CONVERSATION COMMENTS | | | SHARING PARAMETERS * | DOWNLOAD ENABLED |
|---|---|---|---|---|---|---|
| UW 510 | Neilson Method | 4 | 0 | 10 | 1 | Coaches only * | ✓ |
| UW 612 | XYW Method | 2 | 8 | 9 | 12 | Coaches only * | ✓ |
| 904 Petosi Study Group | Select a Framework * — 916 | 8 | 18 | 8 | 9 | Open to Group * — 918 | |
| UW 512 | Number One Method | 0 | 0 | 0 | 0 | Private (Only me) * | ✓ |
| MI 767 | Brazelton Method | 0 | 0 | 0 | 0 | Select visibility * | |
| 926 Clinton Elementary | Select a Framework * | 0 | 0 | 0 | 0 | Select visibility * | |

SHARE WITH MORE GROUPS

[ Type or select one of your groups * ] — 920    [ Add to Group ] — 922

[ Save Sharing Settings ] — 924
Cancel

CATEGORIZED AND TAGGED VIDEO ANNOTATION

BENEFIT CLAIM

This application claims the benefit under 35 U.S.C. 120 as a Continuation of application Ser. No. 14/015,932, filed Aug. 30, 2013, which claims the benefit of prior provisional application 61/839,794, filed Jun. 26, 2013, the entire contents of which are hereby incorporated by reference as if fully set forth herein.

FIELD OF DISCLOSURE

The present disclosure generally relates to creating, storing and using annotations with an audiovisual program such as a stored digital video. The disclosure relates more specifically to improved techniques for association of annotations with both categories and tags in a taxonomy, and related search and organization operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based systems and applications permit playing videos and entering comments on the videos. For example, the YouTube service enables registered users to create and store comments that are associated with stored videos. However, current techniques for creating and storing comments or annotations relating to digital video programs are limited in their utility. Typically it is difficult to correlate a particular comment with a precise location in the digital video program. The standard approach has been for the person writing the comment to specify a location in the comment by writing, for example, "At 9:21 the cat starts playing the piano"—referring to a point approximately nine minutes and twenty-one seconds after the start of the video. However, the time references in this type of comment are inaccurate.

Further, the topics in successive comments of this type, entered by different users, may be completely different. It is usually difficult or impossible to correlate multiple comments relating to the same topic or of the same type. There is also no way to indicate that a particular comment relates to a public taxonomy or other organizational scheme relating to topics or tags.

SUMMARY

The appended claims may serve as a summary of the invention.

BRIEF DESCRIPTION OF THE DRAWINGS

In the drawings:

FIG. 3A illustrates an example screen display of a graphical user interface configured to receive basic information about a video.

FIG. 3B illustrates an example screen display of a graphical user interface configured to receive grade tags and subject tags for a video.

FIG. 3C illustrates an example screen display of a graphical user interface configured to receive identification of supporting materials for a video.

FIG. 10 illustrates the example panel of FIG. 9 in which a new group has been added to the sharing data.

DETAILED DESCRIPTION

Figure 1:
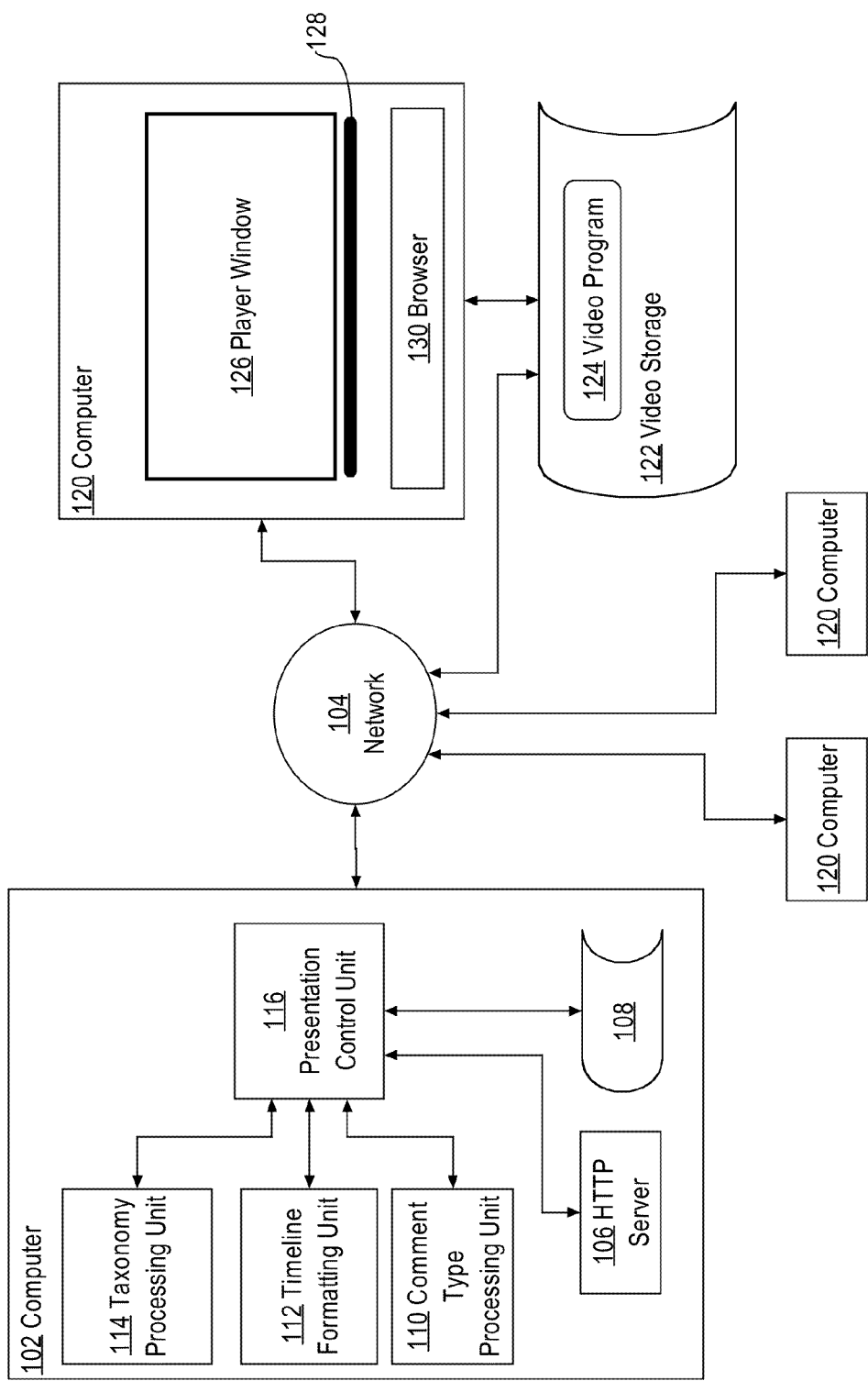
FIG. 1 illustrates an example networked computer system with which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview

The disclosure encompasses various embodiments including those of the following enumerated clauses:

1. A data processing method comprising: a first computer obtaining access to a digitally stored video program and causing playing the video program in a player window of a second computer, wherein the player window includes a linear graphical timeline representing the video program; the first computer receiving from the second computer location input data specifying a point in the video program and determining a time value of the point in the video program; receiving comment type input data indicating a particular comment type among a plurality of available comment types; receiving comment input data; creating and storing, in electronic digital storage coupled to the first computer, a record that associates an identifier of the video program, the time value, the comment type input data, and the comment input data; causing displaying, in the timeline at a position that is proportional to the point, a marker having a particular distinctive appearance from among a plurality of distinctive appearances that correspond respectively to the plurality of available comment types; wherein the method is performed using one or more processors.

2. The method of claim 1 wherein the plurality of distinctive appearances comprises a plurality of different colors, and wherein the causing displaying comprises causing displaying the marker using a particular color that corresponds to the particular comment type.

3. The method of claim 1 further comprising displaying, in association with the player window, a plurality of count values, in which each of the count values is associated with one of the available comment types and indicates a total number of records in the storage that include comment type input data corresponding to the associated one of the available comment types.

4. The method of claim 1 further comprising causing displaying a comment item in a scrolling reverse chronological list of a plurality of comment items, wherein the comment item comprises the time value, the comment input data, and a graphical icon having a particular distinctive appearance from among a plurality of distinctive appearances that correspond respectively to the plurality of available comment types.

5. The method of claim 1 further comprising: causing displaying, near the player window, a scrolling reverse chronological list of a plurality of comment items; wherein each comment item in the plurality of comment items is for a previously entered annotation and comprises a particular time value, particular comment input data, and a particular graphical icon having a particular distinctive appearance from among a plurality of distinctive appearances that correspond respectively to the plurality of available comment types; wherein a first comment item in the plurality of comment items has a first particular time value that is at or after a current time value corresponding to a current point of play of the video program.

6. The method of claim 5 further comprising determining, during playing of the video program, that the current time value of the current point of play of the video program is greater than the first particular time value, and in response thereto, causing re-displaying the list with a new first comment item in the plurality of comment items that has a new first particular time value that is at or after the current time value corresponding to the current point of play of the video program.

7. The method of claim 1, further comprising: receiving taxonomy input data indicating a particular category in a taxonomy; creating and storing, in the record, the particular category in association with the identifier of the video program, the time value, the comment input, and the particular category.

8. The method of claim 7 wherein the taxonomy is any of a framework and a rubric configured for use in evaluating an effectiveness of an educator.

9. The method of claim 1, further comprising: receiving category input indicating a selection of a particular category from among a plurality of categories in a taxonomy; storing, in a data repository, a record comprising at least an identifier of the video recording, the first input, the selection input, the comment input, and the category input; receiving query input identifying the particular category; causing displaying a count of all records in the data repository that are associated with category input matching the query input.

10. The method of claim 1 wherein receiving the comment input data comprises receiving any of text, a video resource or video file, or an audio resource or audio file.

11. The method of claim 1, further comprising: repeating the process of claim 1 a plurality of times and storing a plurality of different comment input data, each associated with a particular taxonomy and a particular category of the taxonomy; receiving taxonomy input specifying the particular taxonomy and the particular category of the taxonomy; generating and causing displaying a compilation video comprising a compilation of a plurality of individual clips from the video program, wherein each of the clips is associated with a different item of the comment input data that matches the particular taxonomy and category.

2.0 Structural and Functional Overview

FIG. 1 illustrates an example networked computer system with which an embodiment may be implemented. A first computer 102 is coupled to one or more second computers 120 directly or indirectly via one or more networks 104. In general, first computer 102 acts as an application server and the second computers 120 are clients. For purposes of illustrating a clear example, a limited number of second computers 120 are shown in FIG. 1, but in other embodiments an arbitrary number of second computers may be used. Network 104 broadly represents one or more of a LAN, WAN, internetwork, or internet and may include the public internet.

Computer 120 executes or hosts a browser 130, which may display one or more static and/or dynamic HTML documents and other data that the browser is capable of receiving over a protocol such as HTTP and rendering in a display unit of the computer 120. In an embodiment, as further described in other sections herein, browser 130 receives HTML documents and related data from computer 102 and renders a player window 126 in a display unit of the computer 120. In an embodiment, a linear graphical timeline 128 is also rendered in the display unit near the player window 126. Computer 120 also is coupled to video storage 122, which contains a video program 124. In various embodiments, video storage 122 is locally coupled to computer 120, or the video storage is coupled to the network 104 and may not be owned or operated by the owner or operator of the computer 120. For example, video storage 122 could be a video storage site that is accessible via the public internet and located in a third party data center, cloud service provider, or part of a third party commercial service. Video storage 122 also could be owned, operated, managed or maintained by an institution, such an enterprise, a government entity such as a school district or county board of education, or any other suitable entity. In some embodiments, video storage 122 may be co-located with computer 102, and owned or operated by the same entity that controls the computer 102.

Computer 102 comprises, in one embodiment, an HTTP server 106 and storage 108 coupled to a presentation control unit 116. A comment type processing unit 110, timeline formatting unit 112, and taxonomy processing unit 114 are coupled to the presentation control unit 116. In an embodiment, the HTTP server 106 is configured to serve static and/or dynamic HTML documents, and other content or data that can be served over HTTP, via network 104 to a compatible client such as browser 130 of computer 120. Storage 108 comprises a relational database, object database, and/or file server and/or other data repository for files and data that are used transiently or persistently by the other elements of computer 102.

In an embodiment, the comment type processing unit 110 is configured to receive comment types and comment text, or other comment data items, associated with comments on a video program and to associate and store the comment types and comment text in storage 108 in a record that identifies the video program. Specific techniques for performing these functions are further described in other sections herein.

In an embodiment, the timeline formatting unit 112 is configured to generate data that can be rendered at browser 130 to cause displaying the timeline 128 with particular icons, colors, graphics, or other elements of a distinctive appearance. Specific techniques for performing these functions are further described in other sections here.

In an embodiment, taxonomy processing unit 114 is configured to manage one or more taxonomies, each having a plurality of categories, and to receive taxonomy input that identifies a taxonomy and a category with which the video program 124 is associated. Specific techniques for performing these functions are further described in other sections here.

In an embodiment, presentation control unit 116 is configured to control interactions of the computer 120 with other elements of computer 102 and to implement applications, services, or features of a video program commenting service. For example, presentation control unit 116 may be configured to manage user accounts, receive and cause authentication of user security credentials, receive and store metadata relating to particular videos, control the taxonomy processing unit 114 to obtain a definition of one or more taxonomies and categories for association with the video program 124, control the comment type processing unit to respond to requests to associate user comments with records in the storage 108, and control the timeline formatting unit 112 to cause displaying or redisplaying the timeline 128 using distinct appearances or indicia associated with comments and other data. Specific techniques for performing these functions are further described in other sections here.

In an embodiment, each of the processes described in connection with the functional units of FIG. 1 may be implemented using one or more computer programs, other software elements, and/or digital logic in any of a general-purpose computer or a special-purpose computer, while performing data retrieval, transformation and storage operations that involve interacting with and transforming the physical state of memory of the computer. The disclosure herein is directed to computer implementations of the processes, functions and functional units described herein, and the disclosure is not intended to preempt the use of other practical implementations of the processes and functions herein using means other than computers.

Figure 2B:
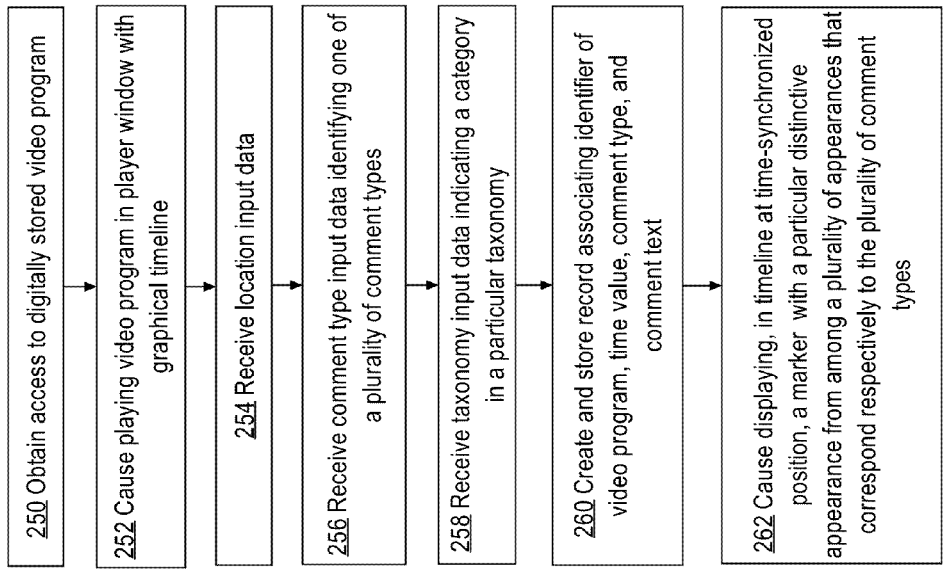
FIG. 2B illustrates an example data processing method according to an embodiment.
Figure 2A:
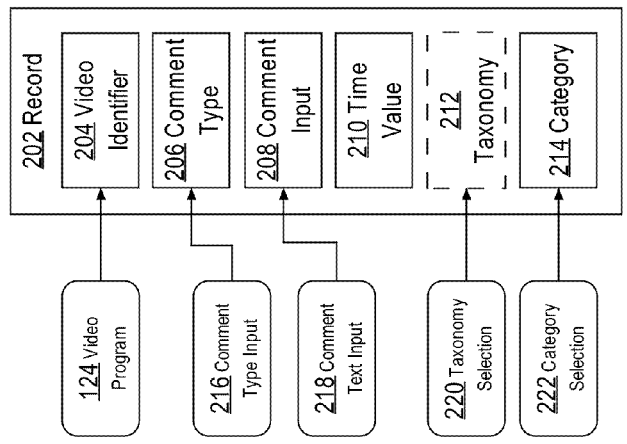
FIG. 2A illustrates example data sources and an example database record.

FIG. 2A illustrates example data sources and an example database record. In an embodiment, as outlined above and as described in more detail in other sections herein, a database record 202 is formed on the basis of obtaining or receiving information about a video program 124, comment type input 216, comment text input 218, a taxonomy selection 220, and a category selection 222 indicating a particular category within a taxonomy identified by the taxonomy selection. Using the processes that are described in more detail herein, data values from these input sources are associated in the database record 202. In one embodiment, the record 202 comprises a row in a relational database, but in other embodiments, the data shown in FIG. 2A may be configured using a plurality of tables, in a graph, or in other forms of data representation.

In an embodiment, database record 202 comprises and associates a video identifier 204, comment type 206, comment input 208, time value 210, and category 214; optionally, the record also may include an identifier of a taxonomy 202. In one embodiment, the video identifier 204 uniquely identifies a particular video program 124. The particular technique used to generate video identifier 204 is not critical; in one embodiment, for example, the presentation control unit 116 is configured with a base or seed identifier value, which is increased monotonically as users register videos in the system, as further described.

In an embodiment, comment type 206 specifies a particular comment type from among a plurality of available comment types. The particular available comment types may vary in various embodiments. For example, in an embodiment in which the system is configured to receive comments about a video showing a presentation, comment types may include: Questions, Suggestions, Strengths, Notes. Other embodiments that are used for other purposes may have other comment types.

In an embodiment, comment input 208 comprises text expressing a comment about a particular scene, topic, location, or occurrence within the video program 124. In some embodiments, comment input may include rich formatted text, or text with encodings that are used in rendering the comment according to particular type fonts or styles. In some embodiments, comment input at block 218 may comprise a video file, an audio track, or other audiovisual input that the user records at the time of commenting on another video, or obtains from storage and associates with the record 202. In an embodiment, the time value 210 indicates a playback time point in the video program 124 with which the comment input 208 is associated. The time value 210 may be automatically calculated in response to an input signal from the user, as further described herein, or entered explicitly.

In an embodiment, the category 214 identifies a category in a taxonomy. For example, in educational applications, the taxonomy may be a framework or rubric specifying good education practices, which has been developed by a particular organization or entity, and the techniques herein enable coding videos against such frameworks or rubrics to help measure conformance or performance in relation to the specified framework or rubric. In an embodiment, a name of the taxonomy and permitted categories are stored in storage 108. In some embodiments, the record 202 also may include an identifier of the taxonomy 202, or there may be a single implicit taxonomy.

FIG. 2B illustrates an example data processing method according to an embodiment. In an embodiment, each of the functions described in connection with the blocks of FIG. 2B may be implemented using one or more computer programs, other software elements, and/or digital logic in any of a general-purpose computer or a special-purpose computer, while performing data retrieval, transformation and storage operations that involve interacting with and transforming the physical state of memory of the computer. The disclosure herein is directed to computer implementations of the processes, functions and functional units described herein, and the disclosure is not intended to preempt the use of other practical implementations of the processes and functions herein using means other than computers.

For purposes of illustrating a clear example, the description of FIG. 2B is given with reference to FIG. 1, FIG. 2A. Other embodiments may be implemented in other contexts.

At block 250, the process obtains access to a digitally stored video program. In an embodiment, block 250 involves receiving user input specifying a networked storage location of a particular video. The input may specify a URL for a video that is available in an online resource, and block 250 may involve accessing the URL and downloading a copy of the video or activating streaming delivery of a video stream that represents the program.

At block 252, the process causes playing the video program in a player window with a graphical timeline. In an embodiment, block 252 involves the first computer 102 providing instructions to browser 130 at the second computer 120 to initiate playing the video program 124 in the player window 126, and to display a graphical timeline 128 having a play head icon that moves along the graphical timeline in approximate time synchronization with the video program. The instructions may take the form of browser-executable code in JAVASCRIPT or a similar language.

At block 254, the process receives location input data. For example, block 254 involves the browser 130 detecting input from a keyboard, pointing device, or touchscreen of the second computer 120 at a position associated with pausing the video or signaling a comment. In one embodiment, the input is a click, tap, touch or other signal on the play head icon of the timeline 128; this input means, in effect, "Enter a comment for this point in the video." Alternatively, the input may be a click, tap, touch or other signal indicating selection of a button, icon or other user interface widget associated with a prompt such as "Leave comment now" or a similar message. In an embodiment, block 254 also includes the first computer 102 receiving a time value indicating a playback time in the video at which the input was received; the time value may be determined by the browser-executable code at the second computer and provided in a response or post, using HTTP or another protocol, back to the first computer.

At block 256, the process receives comment type input data identifying one of a plurality of comment types. In an embodiment, block 256 involves receiving input indicating a selection of a tab in a graphical user interface, a radio button, or other GUI widget that specifies a type of comment to use for a comment associated with the location input data. The particular mechanism with which a user selects a type for a comment is not critical.

At block 258, the process receives taxonomy input data indicating a category in a particular taxonomy. In various embodiments, block 258 may be performed at any point in the process and, for example, may be performed at the time that access to a video program is originally obtained at block 250. For example, the taxonomy and category applicable to a particular video may be specified as part of a registration process by which a user adds metadata about a particular video to the system. Additionally or alternatively, a taxonomy and/or category may be specified at the time that the user enters a comment or specifies the location input data. Explicitly specifying a taxonomy is not required and there may be a default or implicit taxonomy that applies to all videos in a system; alternatively, a category may be left un-selected and there need not be a default category.

At block 260, the process creates and stores a record associating the identifier of the video program, the time value, the comment type and the comment text. In this manner, the particular type of a particular comment, as well as the comment itself and the time value of the location or point at which the user signaled making the comment, become bound and associated with an identifier of the video program and stored in a record. Optionally, the category and/or taxonomy also may be stored in the record at block 260. In some embodiments, block 260 may comprise receiving a recording of audio or video representing a comment, rather than text, and associating the recording with the video program. For example, in some embodiments block 256, 258, 260 may be arranged to cause a graphical user interface to prompt or permit the user to record video via an attached webcam and microphone, store and upload the video, and then associate the new video as an annotation related to a specific moment in time with respect to the video program.

At block 262, the process causes displaying, in the timeline at a time-synchronized position, a marker having a particular distinctive appearance from among a plurality of appearances that correspond respectively to the plurality of comment types. Thus, in an embodiment, a marker in the timeline indicates that a comment is associated with that point in the playback time of the video, and the appearance of the marker indicates a type of the comment. Examples of distinctive appearances include color, shape, size, and form. For example, in a system having four (4) different comment types, markers may be displayed in the timeline using one of four (4) different colors, where each color corresponds to a particular comment type. Alternatively the markers could be displayed with different icons, shapes or forms depending on the comment type, or could use different sizes, orientations, or other appearance attributes. The particular mechanism that is used to provide a distinctive appearance is not critical provided that all comments marked in the timeline and having the same comment type can be identified by a particular distinctive appearance.

In various embodiments, comments may be displayed in a scrolling reverse chronological list of a plurality of comment items, where the comment item comprises the time value, the comment input data, and a graphical icon having a particular distinctive appearance from among a plurality of distinctive appearances that correspond respectively to the plurality of available comment types. Additionally or alternatively, an embodiment may provide for displaying, near the player window, a scrolling reverse chronological list of a plurality of comment items, where each comment item in the plurality of comment items is for a previously entered annotation and comprises a particular time value, particular comment input data, and a particular graphical icon having a particular distinctive appearance from among a plurality of distinctive appearances that correspond respectively to the plurality of available comment types, and where a first comment item in the plurality of comment items has a first particular time value that is at or after a current time value corresponding to a current point of play of the video program.

3.0 Example Graphical User Interface 3.1 Adding a Video

Figure 3D:
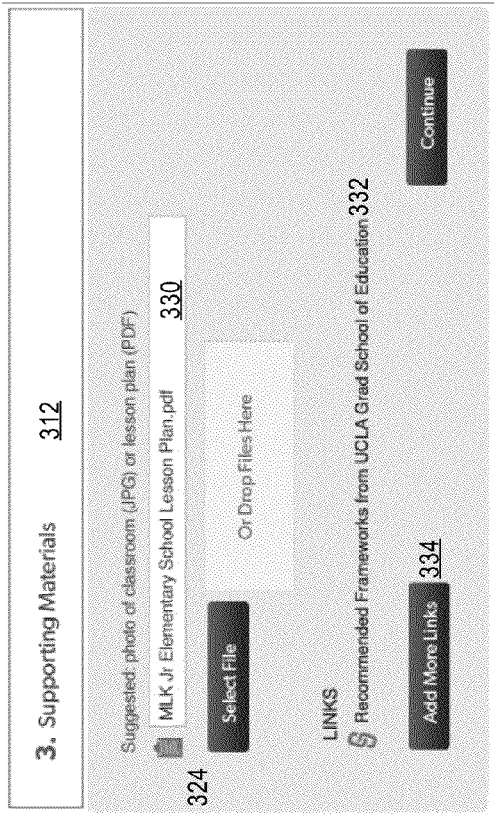
FIG. 3D illustrates an example screen display of a graphical user interface showing a supporting materials panel after certain data is entered.

FIG. 3A illustrates an example screen display of a graphical user interface configured to receive basic information about a video. FIG. 3A, FIG. 3B, FIG. 3C, FIG. 3D illustrate example ways of obtaining information about a video as specified at block 250 of FIG. 2B. Referring first to FIG. 3A, in an embodiment, a screen display 300 comprises a player window 302, a Basic Info panel 304, Tags panel 310, Supporting Materials panel 312, and Share panel 314. In an embodiment, Basic Info panel 304 comprises a title field 306, description field 307, and continue button 308. The title field is configured to receive user text input specifying a title of the video shown in player window 302. The description field 307 is configured to receive user text input comprising a description of the video. Selecting the continue button 308 causes posting the user input to a database record of the system and opening the Tags panel 310.

FIG. 3B illustrates an example screen display of a graphical user interface configured to receive grade tags and subject tags for a video. In FIG. 310, the Tags panel 310 of FIG. 3A is opened, and comprises a grade widget 320 and a subject widget 322. In an embodiment, grade widget 320 is a drop-down menu configured to accept a user selection of an educational grade from among a plurality of configured grade values; grade values that are entered or selected are displayed in the panel below the widget and may be removed by selecting an X icon adjacent to the value. In an embodiment, subject widget 322 is a drop-down menu configured to accept a user selection of an educational subject from among a plurality of configured subject values; subject values that are entered or selected are displayed in the panel below the widget and may be removed by selecting an X icon adjacent to the value. The particular widgets 320, 322 shown in the example of FIG. 3B may be used in an embodiment directed to educational use, such as evaluation of teachers or instructors; in other embodiments, the name, form, and values used in connection with widgets 320, 322 may vary, and other embodiments may have one widget or more than two widgets.

FIG. 3C illustrates an example screen display of a graphical user interface configured to receive identification of supporting materials for a video. In FIG. 3C, the Supporting Materials panel 312 is opened, and comprises a supporting files widget 324 and links region having a URL field 326 and a name field 328. The use of a supporting materials panel is optional in an embodiment, and some embodiments may omit such a panel. In an embodiment, the supporting files widget 324 is configured with a file selection button which, when selected, causes initiating a file browse dialog with which the user may select a file, such as a graphic image, on the user computer 120 or a network resource and upload the file to the system. The supporting files widget 324 also may be configured with a drag-and-drop region into which the user may drag an icon representing a file from another window displayed in the user computer 120, resulting in transferring a copy of the file to the system.

Additionally or alternatively, user input specifying a URL referring to a network resource may be received via the URL field 326, and the name field 328 may be configured to receive user text input specifying a name for the URL. Selecting the continue button 308 causes transferring the file specified using the supporting files widget 324, and/or the input provided via fields 326, 328, to the computer 102 for storage in a record associated with information identifying the video. Further, in an embodiment, the panel 312 is redisplayed and updated, as described next.

FIG. 3D illustrates an example screen display of a graphical user interface showing a supporting materials panel after certain data is entered. In an embodiment, FIG. 3D is the appearance of panel 312 after entry of data as shown at FIG. 3C. The appearance of the supporting files widget 324 is updated to include a filename 330 of a file that has been entered; the filename may be configured as an active hyperlink such that selecting the filename causes the user computer 120 to open and display the contents of the file using an application compatible with the specified file. In an embodiment, icons associated with selecting a file and the drag-and-drop function are retained in the panel 312. In an embodiment, the updated display of FIG. 3B further comprises a link name 332 for a URL that was entered via field 326 of FIG. 3C, and uses the name that was provided via field 328. An add more links button 334 may be configured to receive entry of one or more additional links using an interface of the form shown in FIG. 3C for fields 326, 328.

In some embodiments, panel 312 may include a privacy checkbox which, when selected, causes the system to limit distribution of the document specified using the supporting files widget 324 to the owner of the video.

Figure 4A:
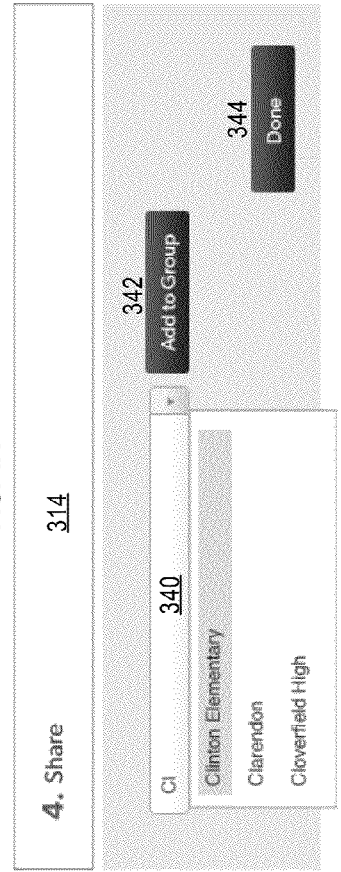
FIG. 4A illustrates an example screen display of a graphical user interface configured to receive group sharing information for a video.
Figure 4B:
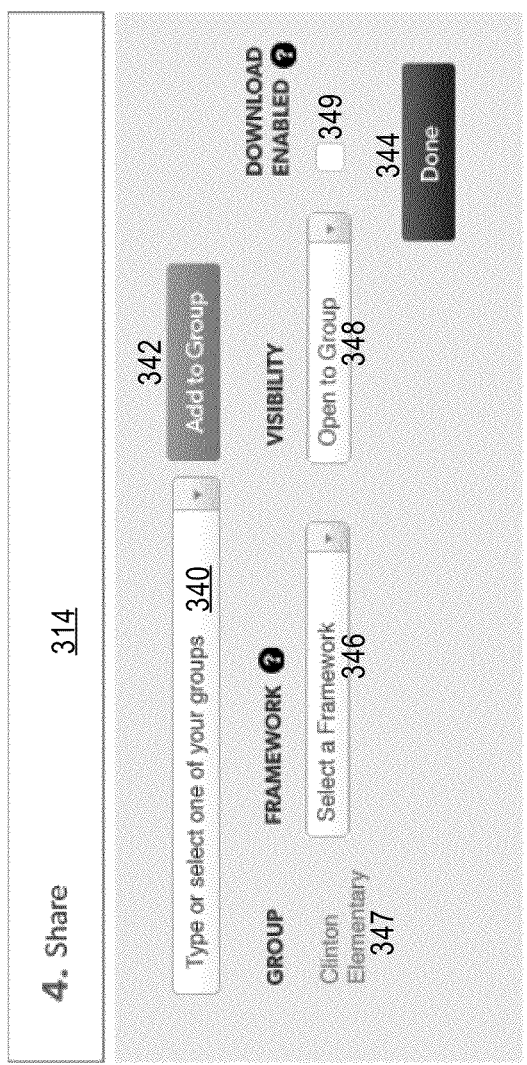
FIG. 4B illustrates an example screen display of a graphical user interface configured to receive group, taxonomy and visibility data for a video.

FIG. 4A illustrates an example screen display of a graphical user interface configured to receive group sharing information for a video. FIG. 4B illustrates an example screen display of a graphical user interface configured to receive group, taxonomy and visibility data for a video. In an embodiment, the share panel 314 is reached and expanded into the views of FIG. 4A, 4B in response to a user completing action with respect to supporting materials as seen in FIG. 3C, FIG. 3D and selecting continue button 308. Referring first to FIG. 4A, in an embodiment, share panel 314 comprises a group input widget 340 configured as a pull-down menu of configured group names that can also receive user text input specifying a new group name. In an embodiment, selecting an Add to Group button 342 causes the current video to become available and thus added to the specified group. Selecting a Done button 344 causes advancing to a video comment view, as described further herein.

The view of FIG. 4B shows an example in which the video has been added to a first group 347 named "Clinton Elementary" and a state of the group input widget 340 has returned to a prompt state to suggest to the user to pull down the menu or type a group name. Further, panel 314 has been context-updated to display a framework selection widget 346, a visibility widget 348, and a download checkbox 349. In an embodiment, the framework selection widget 346 is configured to receive a user selection of a framework with which the video is to be associated. The example of FIG. 4B is structured for use in an educational application, and in the educational context certain taxonomies are termed frameworks or rubrics; in other embodiments, widget 346 may refer to a taxonomy rather than a framework, or may use any other label that is equivalent to a taxonomy in a particular context.

Figure 9:
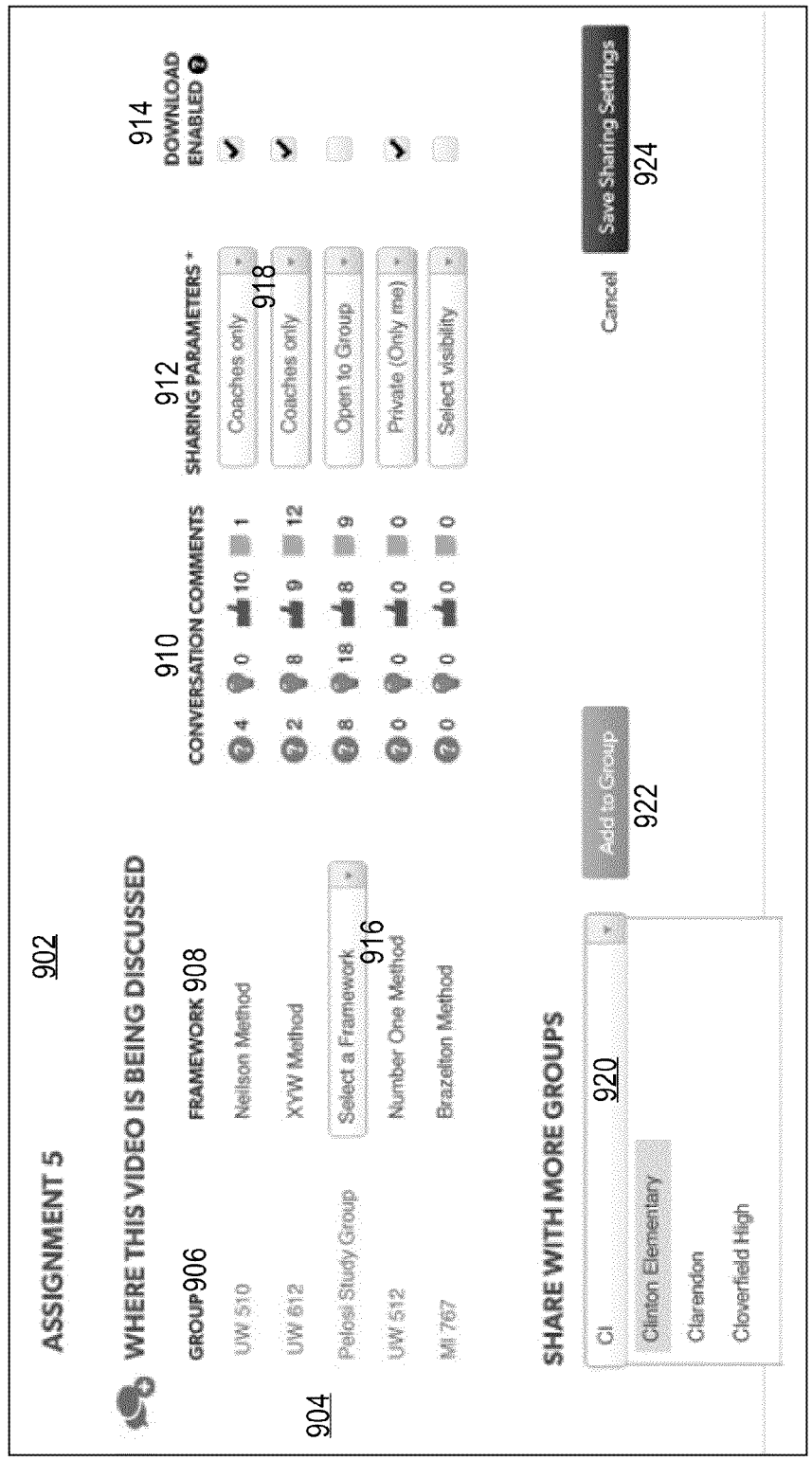
FIG. 9 illustrates an example panel of a graphical user interface that provides sharing data for a video.

In an embodiment, the visibility widget 348 is configured to receive user input selecting one of a plurality of available visibility levels that specify what level of video access is to be granted to the specified group; the selection and use of visibility levels is further described herein in other sections relating to FIG. 9. In an embodiment, the download checkbox 349 is configured to receive user input indicating whether the group or its members are permitted to download a copy of the associated video.

Using these processes, general information about a video may be entered into the system and the video becomes associated with a taxonomy from which categories may be selected in other operations for association with the video. In an embodiment, storing a video in the system causes the system to generate a unique identifier value for the video; the unique identifier is stored in storage 108 and may be used in some embodiments as a key value for queries and other operations that address a database row representing the video.

3.2 Processing Comment Type Data

Figure 5:
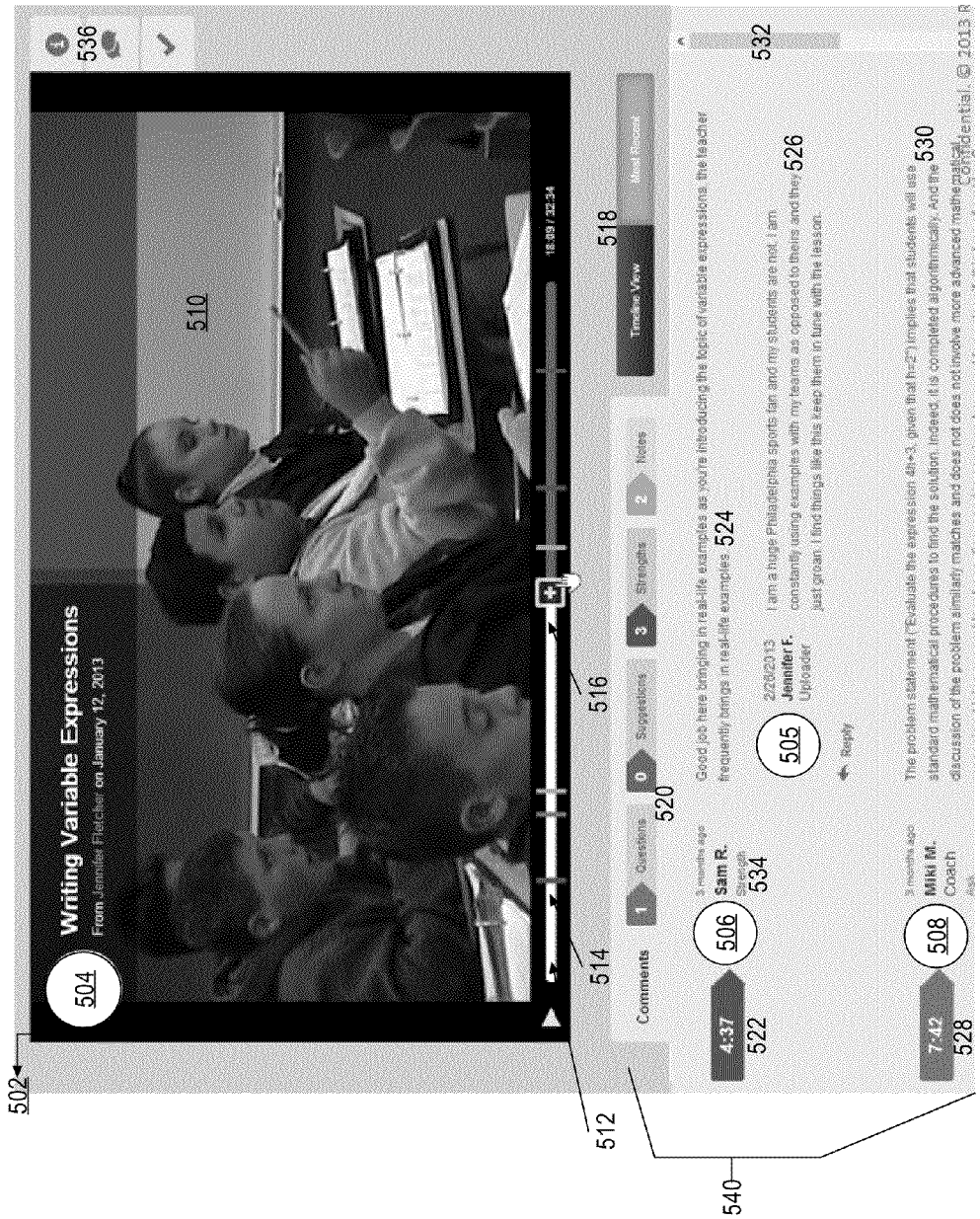
FIG. 5 illustrates an example screen display of a graphical user interface showing a video player window, timeline, markers with distinctive appearances, and comments.

FIG. 5 illustrates an example screen display of a graphical user interface showing a video player window, timeline, markers with distinctive appearances, and comments. In an embodiment, a screen display 502 comprises a video player window 510 depicting, in this example, a frame of a video that was entered into the system by a user indicated by a thumbnail image 504 and having a title, user name and date shown in the video window.

In an embodiment a timeline 512 is configured below or near the video player window 510, and comprises one or more markers 514 that indicate locations at which comments have been entered in a comment list 540 comprising a plurality of comments 524, 526, 530. For purposes of illustrating a clear example, the comments 524, 526, 530 are shown as text comments, but in other embodiments comments may comprise links or icons representing video files or audio files that contain comments and have been associated with the video shown in the window 510. Timeline 512 further comprises a play head indicator 516 which represents a current position of playback of the video. In an embodiment, timeline 512 represents an entirety of a duration of the associated video, and markers 514 are displayed in the timeline at positions that are proportional, as a percentage of total video duration or playing time, to times at which the markers were created, as further described.

In an embodiment, a plurality of function icons 536 is configured adjacent to the video player window 510. Selecting one of the function icons 536 causes the system to display or prompt for additional information as further described in other sections herein.

In an embodiment, each of the markers 514 is displayed using one distinctive appearance that is selected from among a finite plurality of available distinctive appearances for markers. For example, in one embodiment, each of the comments in comment list 540 has an associated comment type from among a finite plurality of available comment types 520. In the example of FIG. 5, the comment types are Questions, Suggestions, Strengths, Notes, but in other embodiments, other comment types may be used and there may be more or fewer than four (4) comment types. In an embodiment, each of the comment types 520 is associated with a particular distinctive appearance; in the example of FIG. 5, the distinctive appearance is color. Thus, in an embodiment, Questions, Suggestions, Strengths, Notes are associated respectively with orange, green, blue, and yellow, but in other embodiments, other colors or appearances may be used.

Further, in an embodiment, the comment types 520 each indicate a number of comments in the comment list 540 that correspond to that comment type. For example, in FIG. 5 the comment types 520 indicate that there is one (1) Questions type comment in the list 540, three (3) Strength type comments in the list, and two (2) Notes type comments.

In an embodiment, using a comment control widget 518, an order of comments in the comment list 540 may be changed from a chronological ordering according to successive points in the video from the start of the video to the end of the video (a timeline view) or according to a date and time at which a comment was entered (most recent view). In the example of FIG. 5, the timeline view is selected. Consequently, comments in the comment list 540 appear in the order in which markers 514 appear, from left to right, in the timeline 512.

In an embodiment, in the comment list 540, a first comment comprises a time indicator 522 having a distinctive appearance, a text 524, an image thumbnail 506, and identification data 534. In an embodiment, the time indicator 522 has a distinctive appearance that corresponds to one of the comment types 520. For example, if one of the comment types 520 is Strength and has a distinctive appearance of blue color, then the time indicator 522 is also shown in blue, and includes a time value indicating a specific time in the video at which the comment was made. In the example of FIG. 5, the time value is "4:37". The text 524 reproduces any comment text that a user entered. Note that a second comment text 530 is associated with a time indicator 528 having a different distinctive appearance—orange color in the example of FIG. 5—corresponding to a different one of the comment types 520. In an embodiment, selecting the time indicator 522 enables the user to control the video playback by changing the play head to a different specified time or time location in the timeline 512.

The image thumbnail 506 may be a graphical image of a face of a user who provided the comment. Comments may be provided to the system by the owner or subject of the video in video player window 510, or by another user who is different than the owner or subject of the video. In an embodiment, the identification data 534 comprises a timestamp, a username, and a comment type indicator. The timestamp indicates a time at which the comment was entered and may be given in summary form, such as "3 months ago". The comment type indicator corresponds to one of the comment types 520, typically in singular form, such as "Strength", "Question," "Suggestion," "Note," etc.

A first comment text 524 may be associated with a second comment 526 of a second user indicated by a second graphical thumbnail 504 constituting a reply to the first comment. A reply may be indicated by indentation. Entering a comment has the effect of causing the system to generate a unique comment identifier for the comment, for storage in a row of a table in storage 108 in association with comment metadata as previously described. Each such row also may include the unique identifier of the associated video, thereby binding a comment to a particular video. Further, a unique comment identifier of another related comment such as a reply may be stored in a row that represents a first comment, to enable associating threads of related comments.

The position of comment list 540 in relation to video player window 510 is arbitrary and the comment list may appear above, below, or to either side of the video player window, or may be superimposed using various techniques. In some embodiments, the distinctive appearance of comments in comment types 520 and/or the counts of comments may be implemented as active hyperlinks which, when selected, cause the system to filter the screen display to show only comments corresponding to a selected hyperlink of a particular comment type or count in the comment list 540.

Figure 6:
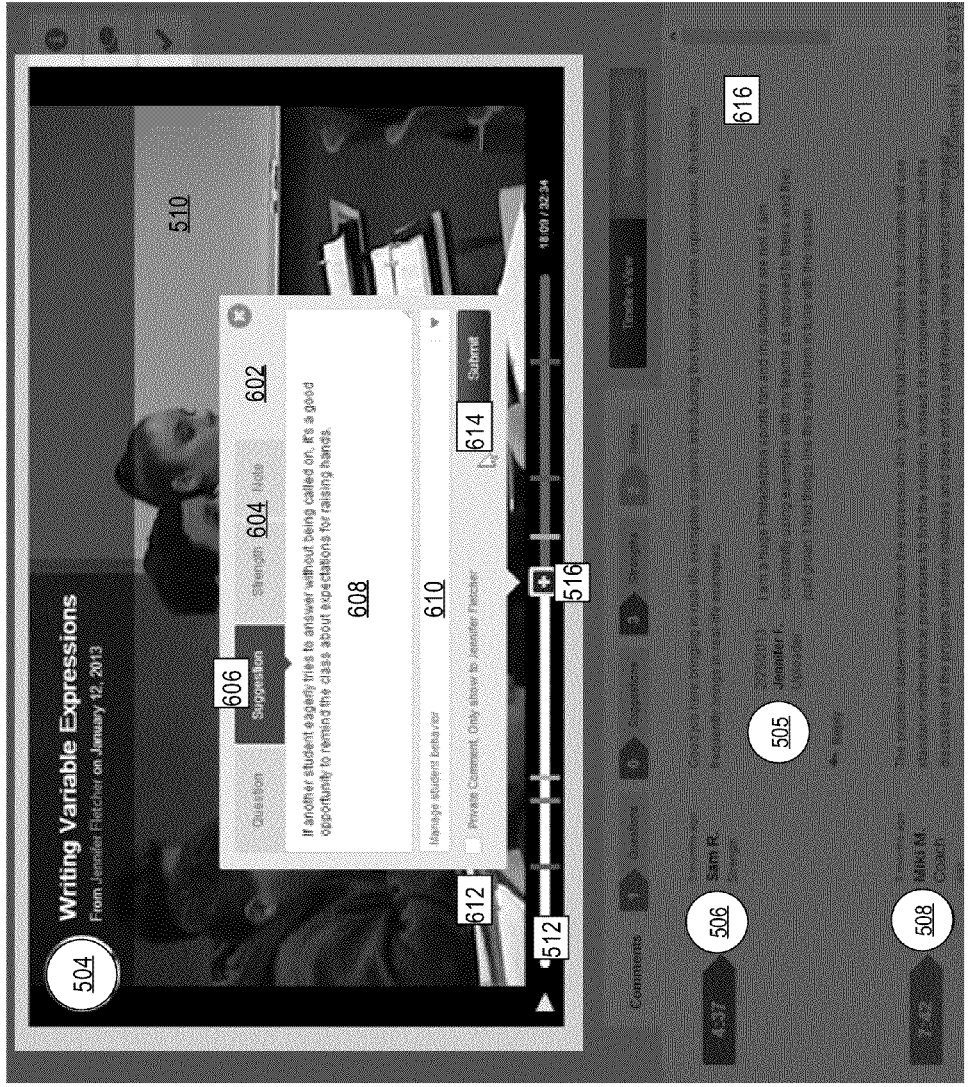
FIG. 6 illustrates the example screen display of FIG. 5 configured to receive comment type input and comment text input.

FIG. 6 illustrates the example screen display of FIG. 5 configured to receive comment type input and comment text input. For example, FIG. 6 represents a screen display that the system may cause to be displayed in response to detecting user input that selects the play head icon 516 at a particular play position. Assume, for purposes of the examples herein, that the play head icon 516 is at time point "18:10" and that a user provided user input selecting the play head icon at that point, to signal the desire to enter a comment. In response, in an embodiment, the system causes displaying a comment entry panel 602 superimposed over video player window 510 and comprising a plurality of comment type tabs 604, comment text field 608, taxonomy category selector 610, privacy checkbox 612, and submit button 614. For purposes of emphasizing comment entry panel 602 to clearly indicate its features, in FIG. 6 the remainder 616 of the screen is shown in a grayed-out, blurred or otherwise de-emphasized format, but that treatment is not required in an implementation. In some embodiments, the video program continues to play in the video player window 510 during subsequent processing of a new comment; additionally or alternatively, the program may be paused.

In an embodiment, the comment type tabs 604 are configured to receive user input selecting one of the tabs and to associate text entered in comment text field 608 with the selected comment type when the submit button 614 is selected. At any time during entry of a comment and before the submit button 614 is selected, the user may select a different one of the tabs 604 to change a comment type with which the comment will be selected. In the example of FIG. 6, the Suggestion tab 606 has been selected so the comment will be associated with a Suggestion type of comment. For purposes of illustrating a clear example, comment text field 608 is shown with text comments, but in other embodiments comments may comprise links or icons representing video files or audio files that contain comments and have been associated with the video shown in the window 510. For example, panel 602 may comprise a prompt for the end user to record a video using an attached webcam and microphone, or to record an audio file using a microphone, and may implement logic to capture the video or audio and associate it with the specified comment type and with the video shown in window 510. Additionally or alternatively, panel 602 may include widgets, prompts or panels associated with a file browse or file open dialog with which the end user may select a previously stored video or audio file to associate with the current video as a comment. In addition, as further described herein with respect to FIG. 13, a user also may associate an additional resource, such as a PDF document, with the current video as a supplement to the comment.

In an embodiment, the taxonomy category selector 610 is configured to receive user input selecting a particular category from the taxonomy that was specified for the video using the framework selection widget 346 (FIG. 4B). Thus, the framework selection widget 346 constrains and determines the taxonomy categories that can be selected using the taxonomy category selector 610. In the example of FIG. 6, the category "Manage student behavior" has been selected, but in other embodiments that use other taxonomies, the selected category and the available category may be different. Further, the taxonomy category selector 610 may be configured to display a taxonomy that is hierarchical, using display techniques or GUI widgets other than single-level pull-down menus. It will be apparent that embodiments using processing as shown in FIG. 6 provide the benefit of associating both a comment type and a taxonomy category with a particular comment in a clear, direct graphical user interface that improves the efficiency of computer processing relating to comment entries. Further, embodiments improve the accuracy of stored data relating to comments by supporting the explicit specification of a comment type using a selector widget as previously described, and also permit performing new kinds of data reporting operations that are based upon using the comment type as a key for organizing and selecting videos and/or comments.

In some embodiments, the taxonomy category selector 610 or other elements of comment entry panel 602 may be configured to receive user input specifying a rating value for the taxonomy category that was selected using the selector. In the example of FIG. 6, in which taxonomy category selector 610 indicates category "Manage student behavior," a rating value could be concurrently received via a separate or integrated GUI widget. For example, ratings could be expressed as numerals, alphanumeric characters, stars, thumbs-up and/or thumbs-down icons, or other indicators of a degree of conformance to the category. Each rating value is stored in association with comment data in a row of the storage 108. Further, each rating value could be used in queries in relation to features such as querying a video library to assemble evidence to demonstrate competency in various areas, preparing video clip reels or video highlight rules, and other processes, as further described herein.

In an embodiment, privacy checkbox 612 is configured to receive user input specifying whether visibility of the associated comment should be limited to the owner or contributor of the video, or allowed for viewing by anyone who is in a group with which the video has been shared or associated. In the example of FIG. 6, the owner or operator of the video "Writing Variable Expressions" is "Jennifer Fletcher" who would be depicted in the thumbnail image 504, and different user, not identified in FIG. 6, is entering comment text 608; that user may determine by selecting the privacy checkbox 612 whether the comment is limited to viewing by "Jennifer Fletcher" or may be seen by all users in one or more groups.

Figure 7:
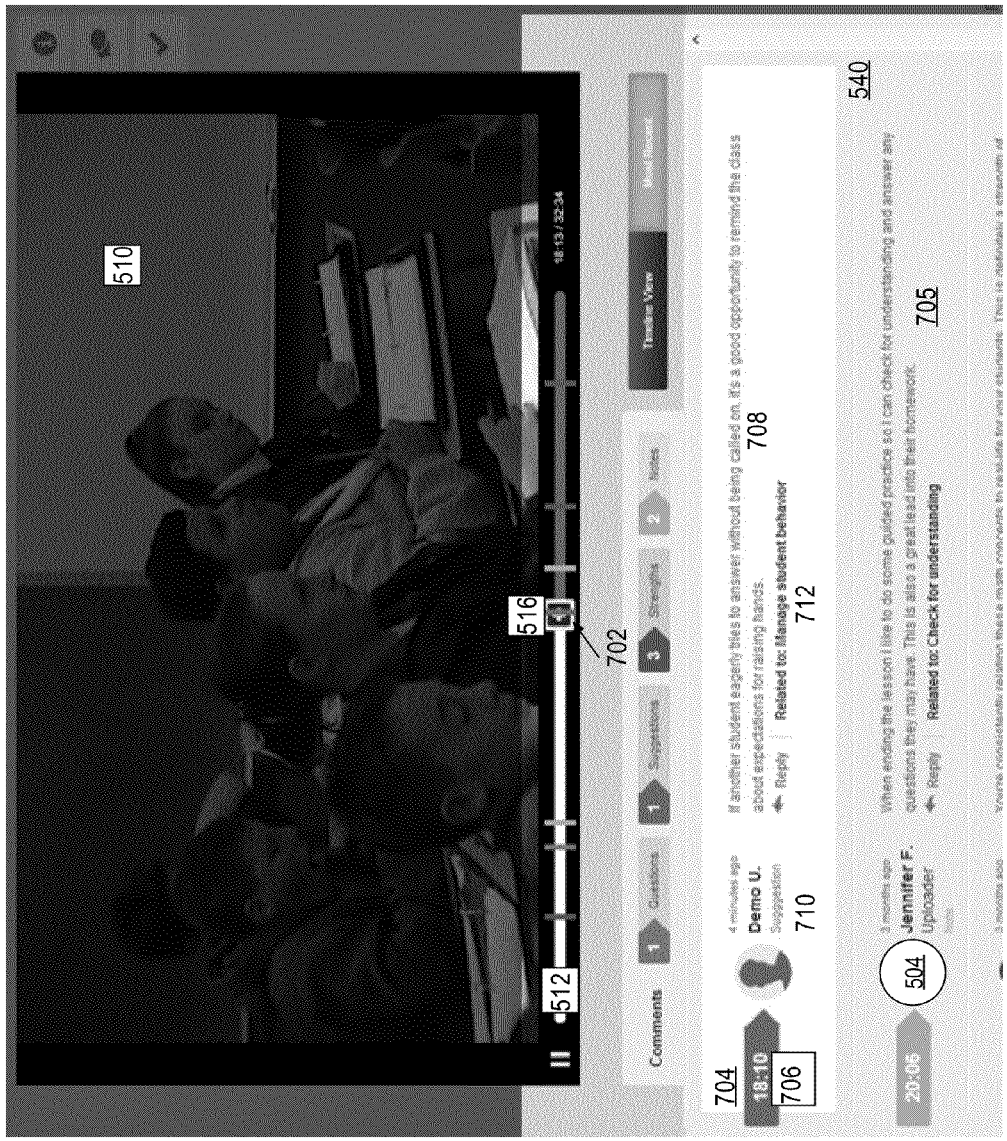
FIG. 7 illustrates the example screen display of FIG. 5 in which the comment type input and comment text input have been integrated and displayed in a comment list.

FIG. 7 illustrates the example screen display of FIG. 5 in which the comment type input and comment text input have been integrated and displayed in a comment list. For example, FIG. 7 depicts processing at a stage after the submit button 614 of FIG. 6 was selected after entry of details for a comment as shown in FIG. 6. In response, at a position of play head icon 516, a new marker 702 is displayed having a distinctive appearance that corresponds to the comment type that was selected using panel 602.

In an embodiment, the display is further updated to display the new comment 704 that was entered, with a time indicator 706 having a time value corresponding to the position of the play head icon 516 and a distinctive appearance that corresponds to a comment type 520 with which the comment is associated. The time value is "18:10" in this example, but other comments entered at different times would have time values that match the position of the play head in the video at the time of entering the comment. The new comment 704 further comprises identification data 710 that specifies a user name, an actual or approximate timestamp, and a comment type. In the example of FIG. 7, the user name is "Demo U.", the approximate timestamp is "4 minutes ago," and the comment type is "Suggestion"; the comment type value may be displayed using a distinctive appearance corresponding to one of the comment types 520 and to an appearance of the time indicator 706. New comment 704 further comprises text 708, and a taxonomy tag 712 that reproduces one of the categories in the taxonomy with which the video is associated. Some embodiments may omit taxonomy tag 712 from comments in the comment list 540.

In an embodiment, the new comment 704 is displayed having an appearance that is highlighted or otherwise different in appearance than a previously entered comment 705 or other prior comments. The use of a distinct appearance, such as highlighting, for the newly entered comment 704 helps improve user confidence in the system by directing a focus of attention to the new comment so that the user can receive visual confirmation that the comment was saved and entered.

Using the approach of FIG. 6, FIG. 7, computers can more efficiently and compactly display information relating to comments or annotations about an audiovisual program such as a digitally recorded video. In particular, a comment display having the form seen in FIG. 7 efficiently associates a large number of information relating to a comment, including: text; a playback time position in the video; a comment type indicated by a distinctive appearance and a label; a user; a timestamp at which the comment was made; a taxonomy category. The unique association of a video, comment, comment type, and taxonomy category enables generating summaries and reports of a variety of types based on comment type and taxonomy category. The processes described herein for FIG. 6, FIG. 7 may be repeated any number of times at the same position of play head icon 516 or at different positions; thus, any number of comments may be created and saved with respect to the same time value 706 and/or the same position of the play head icon.

Figure 8:
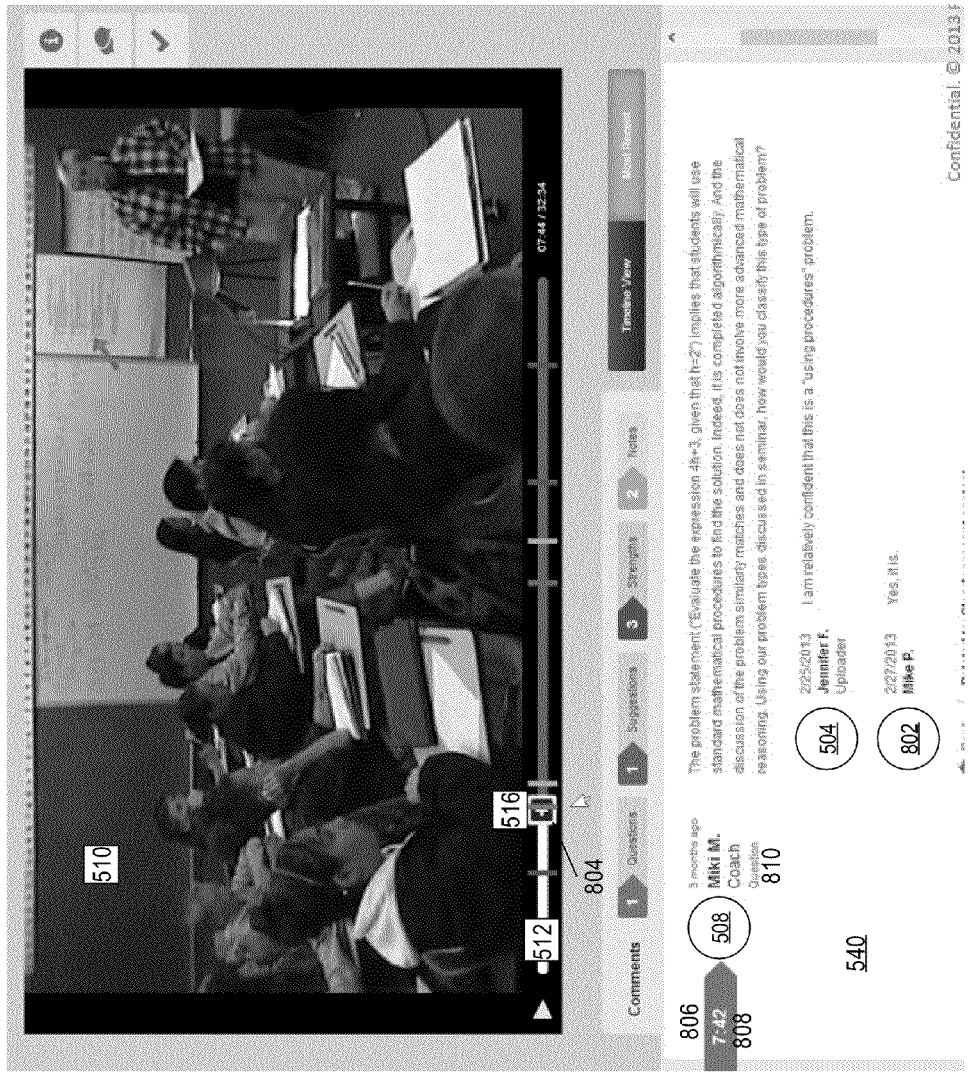
FIG. 8 illustrates the example screen display of FIG. 5 in which a position of a play head has changed and the comment list is redisplayed in time synchronization with the position of the play head.

FIG. 8 illustrates the example screen display of FIG. 5 in which a position of a play head has changed as a result of user input and the comment list is redisplayed in time synchronization with the position of the play head. The example of FIG.

5 illustrates processing and displaying when user input has selected a different particular marker 804 in the timeline 512 as opposed to the markers selected in other views. Selecting a different particular marker 804 may comprise, for example, using a pointing device to click on a marker in the timeline 512, tapping the marker using a touch gesture, or other selection means. As another example, selecting the time indicator 522 enables the user to control the video playback by changing the play head to a different specified time or time location in the timeline 512. In response, the system causes moving the play head icon 516, and the associated point of playback of the video, to a point earlier in the video corresponding to the particular marker 804. Further, the comment list 540 is concurrently updated to display, first, a comment 806 that corresponds to the selected particular marker 804.

The displayed comment 806 may include, for example, a time indicator 808 showing the time point of the selected particular marker 804, using a distinctive appearance that corresponds to the comment type that was stored in association with the comment. The comment list 540 also may be updated to display all other stored comments that are associated with markers for positions later in time than the selected particular marker 804. Using these techniques, markers in timeline 512 may serve as active jump points to permit a user to rapidly select a comment at a particular point in the video program and to cause the video display window 510 to automatically sync to that point while concurrently displaying the comment at that point and later comments. In an embodiment, selecting the time indicator 808 enables the user to control the video playback by changing the play head to a different specified time or time location in the timeline 512.

In an embodiment, output similar to that of FIG. 8 also may be generated and displayed in response to playing the video in video display window 510. For example, playing the video may cause play head icon 516 to advance in the timeline 512, and may concurrently cause the comment list 540 to scroll as the play head icon reaches successive markers, thereby displaying, as the first comment in the comment list, a particular comment that is associated with that marker that was most recently reached or passed. In some embodiments, screen display 502 may comprise a scroll toggle control that may be used to disable such automatic scrolling of the comment list 540 in synch with the markers or the play head icon 516.

In various embodiments, selecting a particular marker 804 causes the video program to begin playing automatically at the point in time within video playback that is associated with the particular marker. Alternatively, selecting the particular marker 804 may cause moving the play head 516 to the position of the selected particular marker and display a freeze-frame of the video program at that point.

3.3 Processing Sharing Functions

FIG. 9 illustrates an example panel of a graphical user interface that provides sharing data for a video. FIG. 10 illustrates the example panel of FIG. 9 in which a new group has been added to the sharing data. In an embodiment, selecting one of the plurality of function icons 536 (FIG. 5) causes displaying a pop-up window, panel or other GUI screen display having the form of FIG. 9, FIG. 10. Referring first to FIG. 9, in an embodiment, a screen display 902 generally comprises a sharing table 940, sharing widget 920, add button 922, and save button 924.

In an embodiment, the sharing table 940 is organized as zero or more rows in which each row represents a group and sharing permissions values associated with that group. Sharing table 940 further comprises, for each row, columns indicating a group value 906, framework 908, comment count 910, sharing levels 912, and download availability 914. In an embodiment, group value 906 indicates the name of a group with which the current video has been shared. For example, group value 906 may indicate the name(s) of group(s) that were specified using share panel 314 (FIG. 4A, FIG. 4B). In an embodiment, framework 908 indicates a taxonomy such as a framework or rubric that has been associated with the current video. For example, framework 908 may match a framework that was selected using framework widget 346 (FIG. 4B). In an embodiment, if a framework has not been specified for a particular group, then the column for framework 908 displays a framework selection widget 916. A value for framework 908 for a particular group may be modified by selecting the framework selection widget 916 and then selecting a framework or taxonomy. In the example of FIG. 9, framework selection widget 916 is displayed because the system has determined that a framework was not selected when the sharing instance was originally created.

In an embodiment, comment count 910 indicates a count for each type of comment that has been entered or stored, correlated to the plurality of comment types. For example, when four (4) comment types have been defined, the comment count 910 includes four (4) separate counts showing total numbers of comments of each of the comment types that have been received and stored in the system. In an embodiment, the names and counts of the comment types are displayed using a distinctive appearance that matches the distinctive appearance of the same comment type in other screen displays of the system. For example, the same color coding may be used as described in connection with FIG. 5. Counts may be for text comments, audio comments, video comments, or the sum of all such kinds of comments that have been entered.

In an embodiment, each value in the comment count 910 may be updated asynchronously as users enter comments. Various forms of push notification or web page updating may be used to cause refreshing the web page containing the screen display to include updated counts as users enter comments. For example, in an embodiment, entering a comment involves a database row insert operation that is bound to a database trigger that pushes a notification to all online client computers using web sockets to provide the new row data and update the display. Alternatively, a page refresh can be used to pull all comments that were entered during a session.

In an embodiment, values for sharing levels 912 indicate the values that were previously specified using the visibility widget 348 (FIG. 4B) for the associated video. In an embodiment, sharing levels are displayed using a sharing widget 918 that permits a user to change the current sharing level of the video for the associated by selecting the widget and then selecting a particular level, which will be enforced if the changed setting is saved using button 924. In an embodiment, download availability 914 indicates whether downloading was enabled using checkbox 349 (FIG. 4B). Values for download availability 914 may be displayed using an active checkbox that may receive user input to change the value for download availability.

Selecting the save button 924 results in storing all data that was entered in relation to screen display 902. In some embodiments, the data could be saved as changes are made by the user without requiring selection of a save button 924.

In an embodiment, the sharing widget 920 is configured to receive user input specifying another group to receive sharing privileges for the video. In some embodiments, the group name may be typed in or selected using a pull-down menu. In response to receiving user input selecting the add button 922, the system is configured to add the specified group to the table 904 and redisplay the screen display 902. Referring now to FIG. 10, an updated screen display 902 includes a new row 926 in table 904 indicating data relating to the specified group that was added as described for FIG. 9. Widgets 916, 918 may be used to specify a taxonomy or framework, and/or sharing parameters, for the newly added group shown in row 926. In an embodiment, multiple groups may be shared at the same time by creating multiple rows, or a single sharing instance may share to multiple groups so that one row is associated with multiple groups. As another alternative, the process described herein involving use of sharing widget 920, add button 922, and row 926 could be implemented in a widget that is independent of table 904.

In an embodiment, the structure of FIG. 9 permits sharing a video to a first group shown in group column 906 as part of a conversation relating to a first framework 908, while concurrently sharing the same video to the same group or a different group as part of a conversation relating to a second, different framework 908. For example, in FIG. 9, the hypothetical video "Assignment 5" is shown as shared with five (5) different groups and four (4) or more different taxonomies or frameworks. Consequently, comments can be gathered from different groups about different frameworks, enabling the owner of the video to direct the video to (and obtain comments from) different groups that may have expertise or experience in evaluating different frameworks.

3.4 Other Video Information

Figure 11:
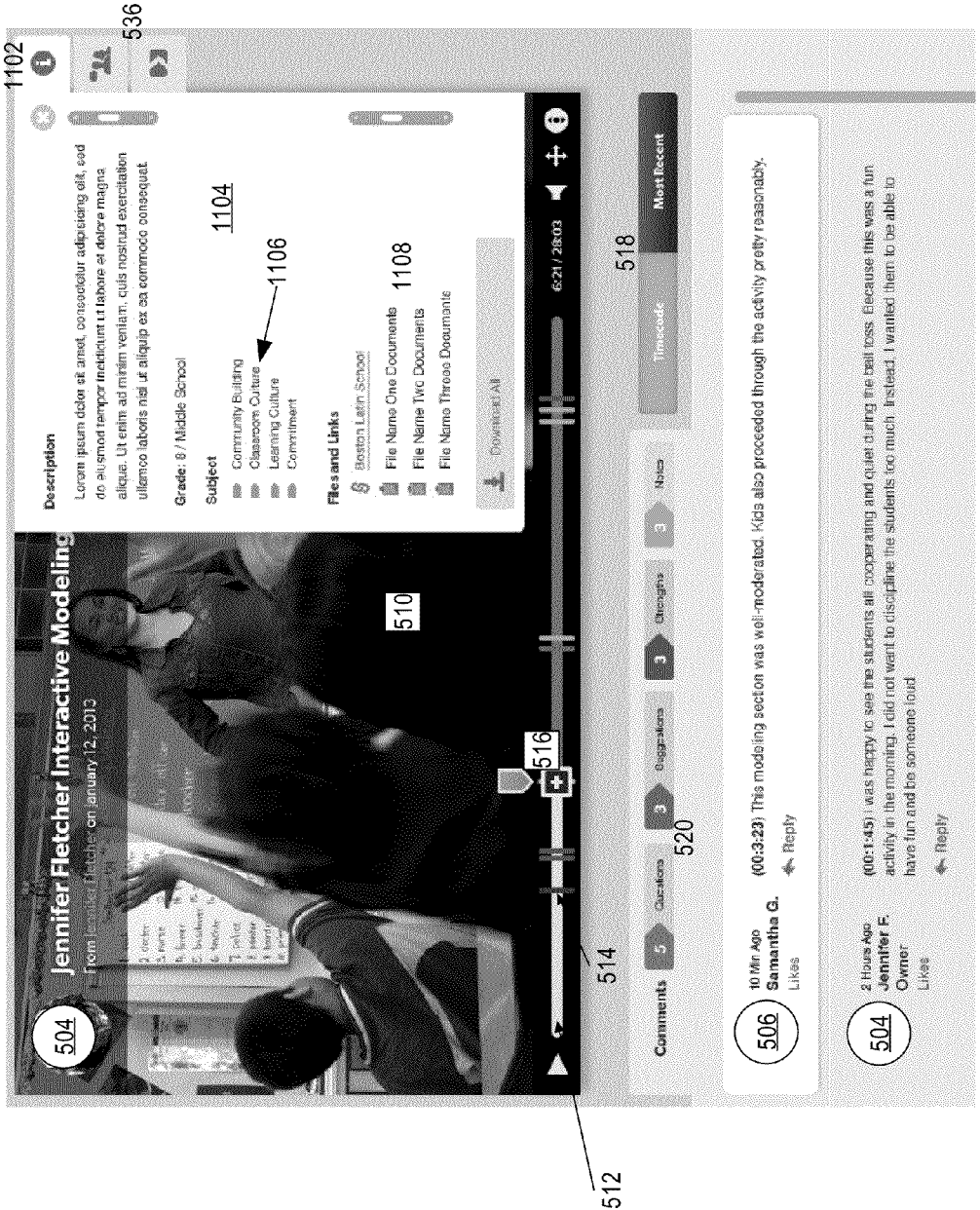
FIG. 11 illustrates an example screen display of a graphical user interface showing a video player window in which an information panel is open.

FIG. 11 illustrates an example screen display of a graphical user interface showing a video player window in which an information panel is open. In an embodiment, user selection of an info tab 1102 from among the function tabs 536 causes the system to generate and display an info panel 1104 superimposed over a portion of video player window 510. In an embodiment, the info panel 1104 displays a description other general metadata that the owner of the video entered at the time of registering the video in the system, as seen in FIG. 3A, FIG. 3B, FIG. 3C, FIG. 3D.

In an embodiment, the info panel 1104 also displays a list 1106 of all grade tags and/or subject tags that have been associated with the video using grade widget 320 and subject widget 322 (FIG. 3B). The info panel 1104 may also include a materials list 1108 that identifies one or more files or links that were specified via the interface of FIG. 3C and associated with the video. Thus, the info panel 1104 and the configuration of the system enable the user to rapidly obtain a display of metadata that has been associated with a video.

Figure 12:
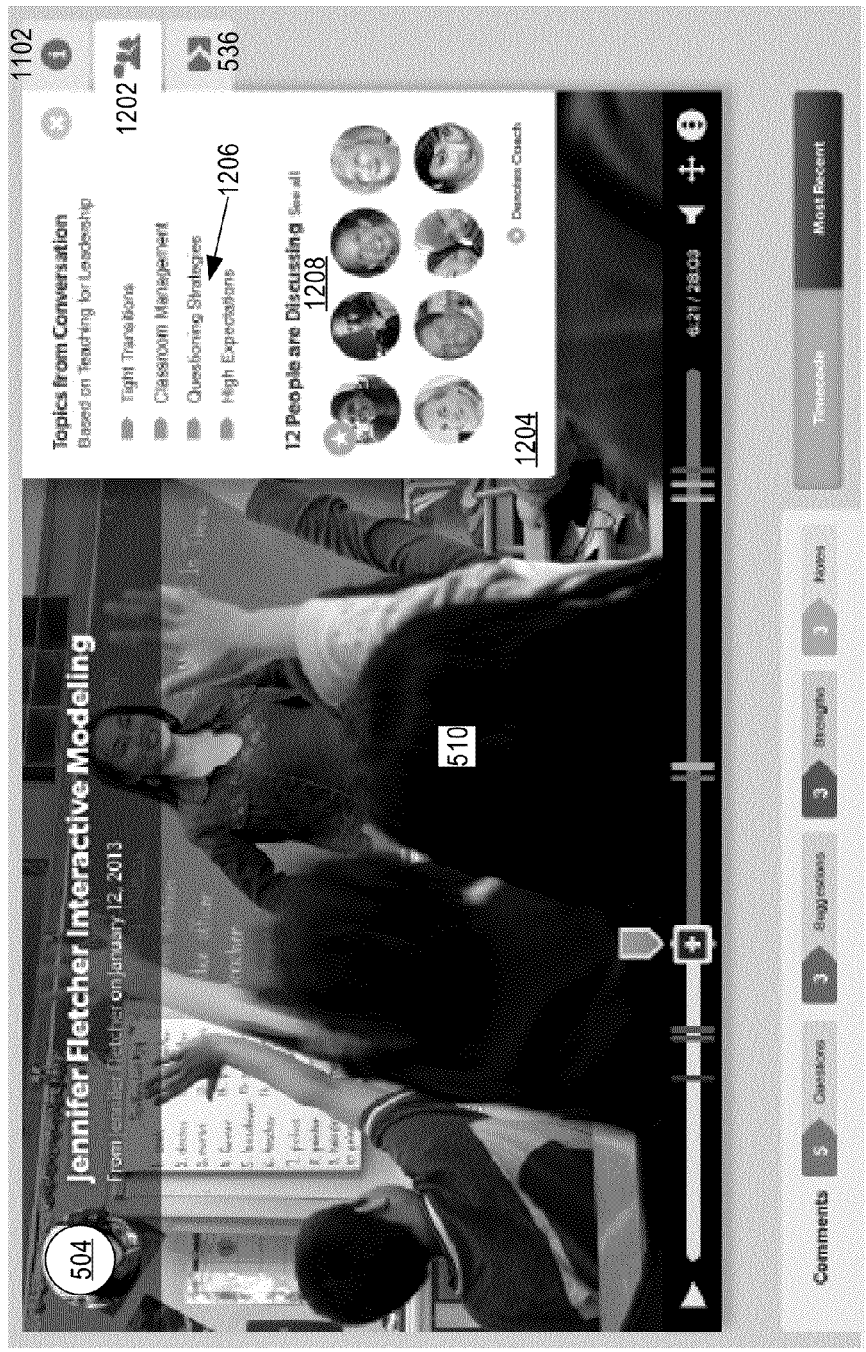
FIG. 12 illustrates an example screen display of a graphical user interface showing a video player window in which a taxonomy category information panel is open.

FIG. 12 illustrates an example screen display of a graphical user interface showing a video player window in which a taxonomy category information panel is open. In an embodiment, user selection of a topics tab 1202 causes the system to generate and display a topics panel 1204 comprising a categories list 1206 and a user list 1208.

In an embodiment, the categories list 1206 automatically indicates all categories, of a "Teaching as Leadership" taxonomy that was specified via taxonomy widget 346 of FIG. 4B, which have been associated with the video in comments that were previously entered and specified a category using taxonomy category selector 610 (FIG. 6). In this manner, a user can rapidly and efficiently obtain a list of categories that have been associated with a video across a large number of comments without having to review individual comments or a list of comments; instead, the system uses automated logic to identify all categories and generates a list containing a single category identifier for all categories that appear in comments. Thus, for example, list 1206 may include just one identifier for a particular category even if that category was specified using taxonomy category selector 610 (FIG. 6) in a large number of comments. This approach provides a powerful way to rapidly visualize the categories that are addressed in a large number of comments without sifting through, filtering or sorting all the comments to determine which categories are mentioned.

In an embodiment, user list 1208 comprises one or more thumbnail icons indicating a face or other image associated with each user who has entered a comment about the subject video. In this manner, a user can rapidly and efficiently obtain a list of users who have commented on a video in a large number of comments without having to review individual comments or a list of comments; instead, the system uses automated logic to identify all users and generates a list containing a single user identifier for all users who entered comments, even if a particular user entered multiple comments at different times. Thus, for example, list 1208 may include just one identifier for a particular user even if that user entered a large number of comments. This approach provides a powerful way to rapidly visualize all individual users who have discussed or commented upon a video without sifting through, filtering or sorting all the comments to determine the set of unique users who have commented.

Figure 13:
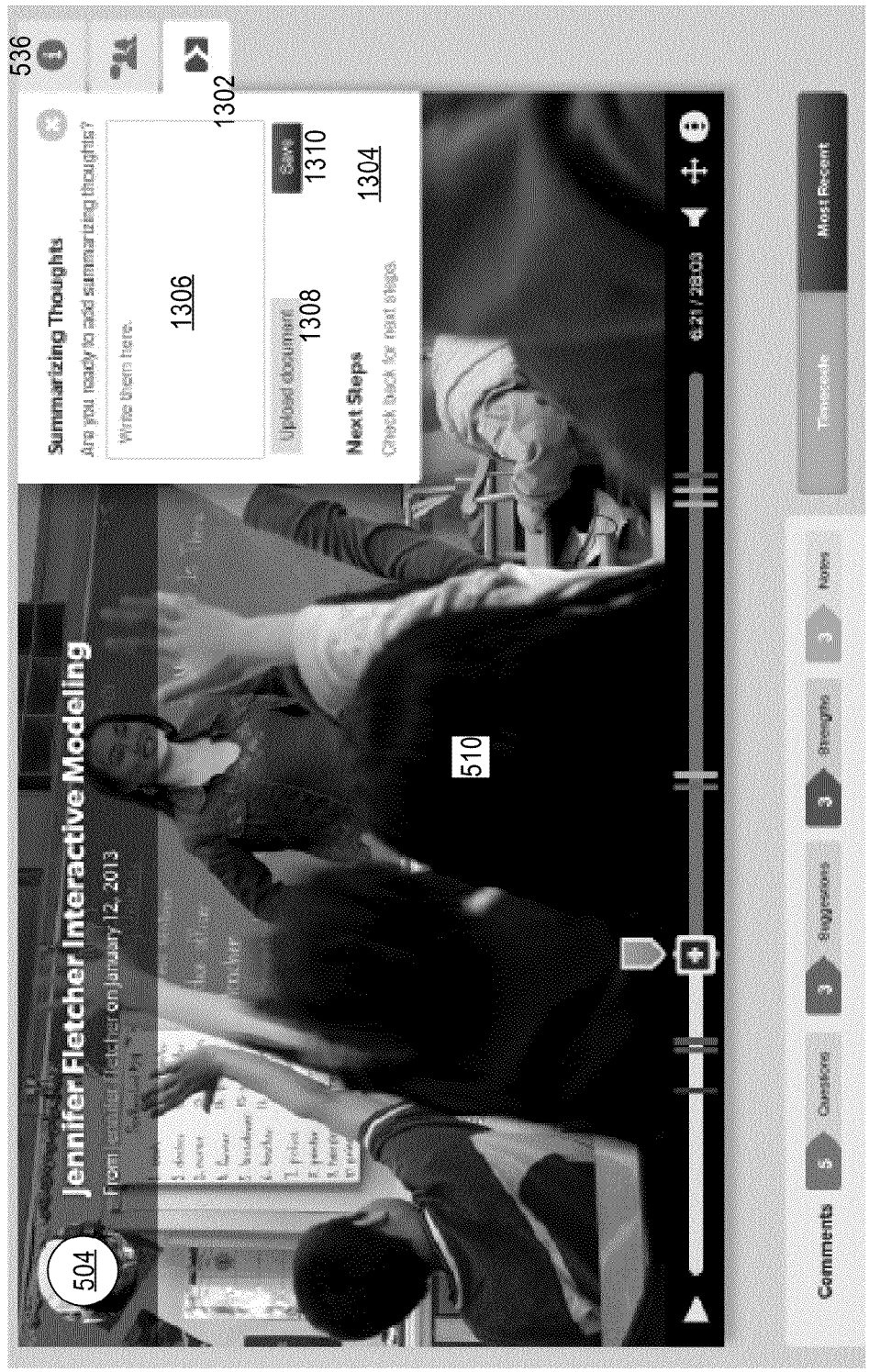
FIG. 13 illustrates an example screen display of a graphical user interface showing a video player window in which a next steps panel is open.

FIG. 13 illustrates an example screen display of a graphical user interface showing a video player window in which a next steps panel (denoted "Summarizing thoughts" in FIG. 13) is open. In an embodiment, user input selecting a summary tab 1302 causes the system to generate and display a summary panel 1304 superimposed over a portion of the video player window 510. In an embodiment, summary panel 1304 comprises a text entry field 1306 that is configured to receive other comments by a user who may have commented on or viewed the video. Field 1306 may serve as a text box for a coach or other viewer or user to suggest next steps or other actionable goals to the owner of the video; in an embodiment, the contents of the field are visible to shared group members who view the video, by selecting the summary tab 1302. For example, a next goal could be to observe the teacher down the hall for tips on an issue related to the video owner's performance. In an embodiment, field 1306 may be configured to receive a selection, specification or upload of a video resource or file, and/or an audio resource or file, and the use of text input is not required.

In an embodiment, user input selecting an upload button 1308 causes the system to generate, in response, a file open dialog with which the user may browse to and select an electronic document or other file to provide to the owner of the video. For example, advisory materials, white papers, slide presentations, or other documents may be uploaded and stored in the system to permit the owner of the video to access information that the commenting user wishes to recommend or provide. In some embodiments, summary panel 1304 may include a privacy checkbox which, when selected, causes the system to limit distribution of the document specified using upload button 1308, as well as all associated comments, to the owner of the video.

In an embodiment, a save button 1310 is configured to receive user input specifying to save the specified text from field 1306 and the document that was provided via button 1308.

3.5 Utility and Benefits; Extensions and Alternatives

Embodiments thus provide a flexible, efficient computer system that is configured to receive and associate metadata, including both comments from among a plurality of comment types and categories in a taxonomy, with a video program and to provide rapid and efficient retrieval, filtering, aggregation and display of such metadata upon demand. Various embodiments are useful in education, instructional coaching, public speaking, sales training, certification for professional industries, psychiatry, training or evaluation of professionals such as attorneys or doctors, sports or athlete training, training of recruiters and/or other fields of education, training or performance analysis. Embodiments do not require the use of comments by third parties, but also can be used for reflection and self-analysis with respect to a self-made or owned video, or a third party video.

In some embodiments, computer 102 is configured to provide lists or links to all videos, or all parts of videos (clips) that are associated with a particular category in a specified framework. In such an embodiment, computer 102 may be configured to display user interface panels or widgets that prompt for selection of a particular taxonomy and a particular category. In response, the computer 102 searches database 108 using the specified taxonomy and category as keys, and returns a list of videos that match the specified taxonomy and category. Additionally or alternatively, one or more elements of the computer 102 may be configured to generate and display one or more video player windows each containing a freeze frame and a link to one of the videos in the list that matches the specified taxonomy and category.

Additionally or alternatively, one or more elements of the computer 102 may be configured to generate and display a single video comprising a compilation of clips from each of the videos in the list that matches the specified taxonomy and category. In this manner, the owner of a video, an administrator, or other user may use computer 102 to reassemble and package a set of video clips that are related to a taxonomy or category in the form of a summary reel or highlight reel to permit comparison of performance with respect to the specified category.

In some embodiments, generating video summaries in this manner is supported by creating and storing an endpoint time value for each comment. Additionally or alternatively, the system may prompt the user, at the time of entering a comment (FIG. 6), to select one of a plurality of fixed pre-determined comment times, such as 10 seconds, 30 seconds, 45 seconds of video for a comment. Additionally or alternatively, the system may automatically attach a fixed or default duration of video play to each comment.

In some embodiments generating a summary reel may be supported by querying the storage 108 to obtain metadata for all videos with comments that are associated with a particular framework row; the system then selects one or more sets of metadata, representing videos, from that result set. The system may be configured to adjust the duration of the clips to be consistent and to either output separate clips as examples, or reassemble the clips into a new video.

Figure 15:
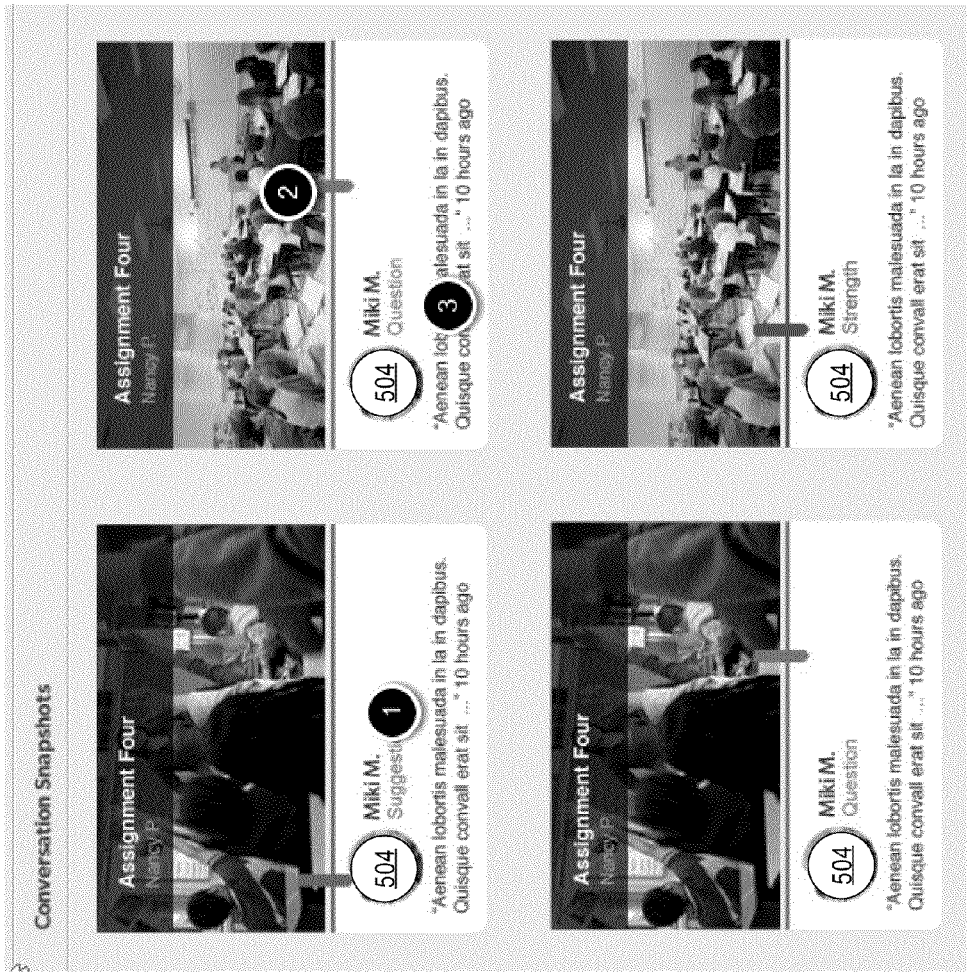
FIG. 15 illustrates an example of using comment type information in combination with video time values and comments to create distinct functionality.

FIG. 15 illustrates an example of using comment type information in combination with video time values and comments to create distinct functionality. As indicated at circle 1, in this embodiment color indicates the comment type along with the word description ("Suggestion"). At circle 2, the marker replicates the visual indicator used on the video conversation page (here the indicator is color) and indicates the relative position of the comment on the video timeline based on the length of the video as a percentage (e.g. comment at 2:12, total run time 14:20). A text annotation appears at circle 3. In some embodiments, the display of FIG. 15 or other views showing comments (e.g., FIG. 5, FIG. 6) may also display the taxonomy category that was selected using the selector 610. Further, links to video comments or audio comments may be provided in the display.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
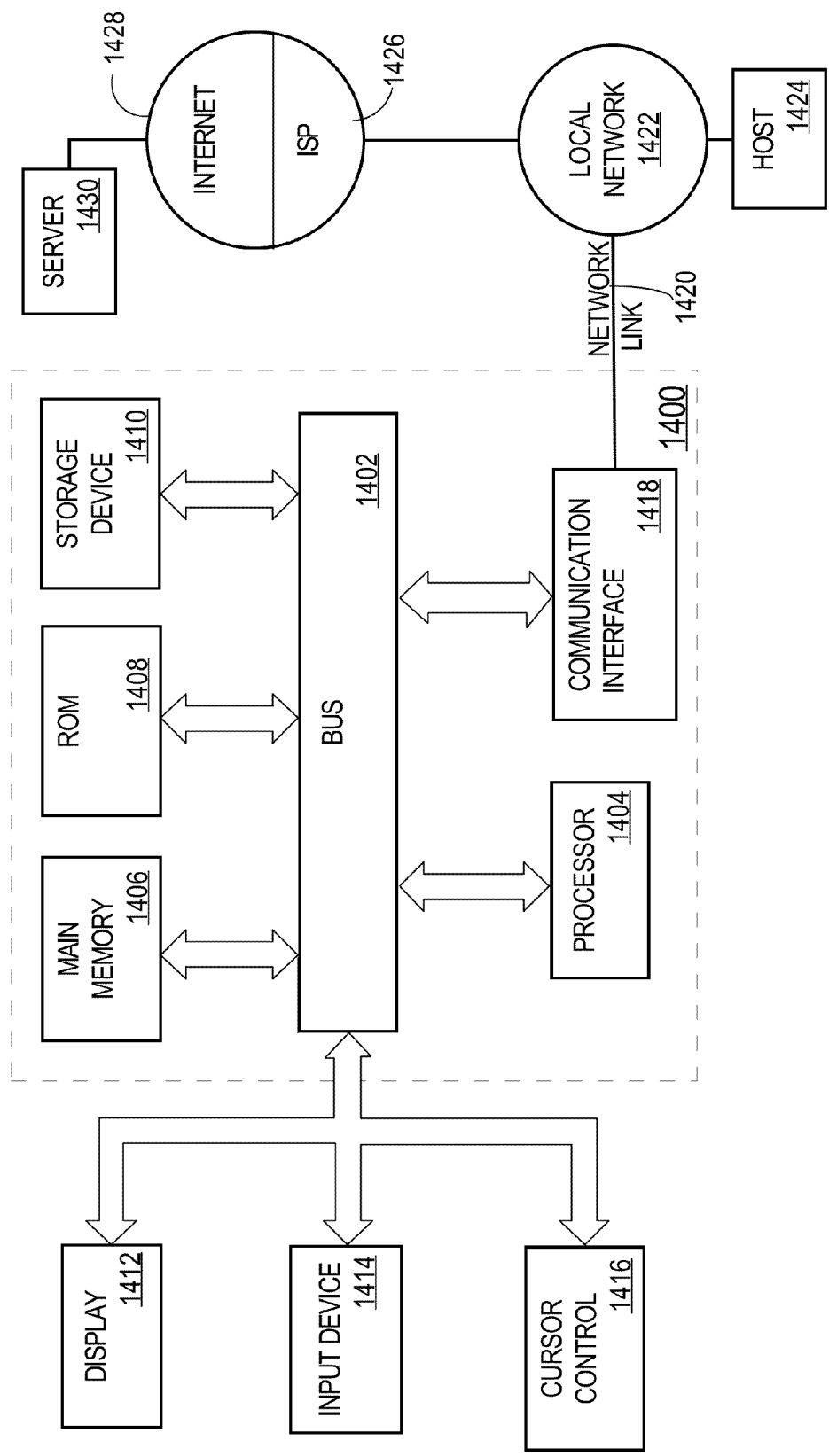
FIG. 14 illustrates an example computer system with which an embodiment may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:

a first computer obtaining access to a digitally stored video program and causing playing the video program in a player window of a second computer, wherein the player window includes a linear graphical timeline representing the video program;

the first computer receiving from the second computer, input data specifying a point in the video program and determining a time value of the point in the video program;

receiving comment type input data from the second computer indicating a particular comment type among a plurality of available comment types;

wherein each comment type of the plurality of available comment types indicates a general substance of a comment;

receiving comment input data from the second computer;

creating and storing, in electronic digital storage coupled to the first computer, a record that associates an identifier of the video program, the time value, the comment type input data, and the comment input data;

causing displaying, in the timeline, at a position that is proportional to the point, a marker having a particular distinctive appearance from among a plurality of distinctive appearances that correspond respectively to the plurality of available comment types;

the first computer causing playing the video program in a second player window of a third computer, wherein the second player window includes a second linear graphical timeline representing the video program, wherein the second computer is different than the third computer;

the first computer receiving from the third computer, second input data specifying a second point in the video program and determining a second time value of the second point in the video program;

receiving second comment type input data from the third computer indicating the particular comment type;

receiving second comment input data from the third computer;

creating and storing, in the electronic digital storage coupled to the first computer, a second record that associates a second identifier of the video program, the second time value, the second comment type input data, and the second comment input data;

causing displaying, in the second timeline, at a second position that is proportional to the second point, a second marker having the particular distinctive appearance from among the plurality of distinctive appearances that correspond respectively to the plurality of available comment types and, at the position that is proportional to the point, the marker;

wherein the method is performed using one or more processors.

2. The method of claim 1 wherein the plurality of distinctive appearances comprises a plurality of different colors, and wherein the causing displaying comprises causing displaying the marker using a particular color that corresponds to the particular comment type.

3. The method of claim 1 further comprising displaying, in association with the player window, a plurality of count values, in which each of the count values is associated with one of the available comment types and indicates a total number of records in the storage that include comment type input data corresponding to the associated one of the available comment types.

4. The method of claim 1 further comprising causing displaying a comment item in a scrolling reverse chronological list of a plurality of comment items, wherein the comment item comprises the time value, the comment input data, and a graphical icon having a particular distinctive appearance from among a plurality of distinctive appearances that correspond respectively to the plurality of available comment types.

5. The method of claim 1 further comprising:
causing displaying, near the player window, a scrolling reverse chronological list of a plurality of comment items;
wherein each comment item in the plurality of comment items is for a previously entered annotation and comprises a particular time value, particular comment input data, and a particular graphical icon having a particular distinctive appearance from among a plurality of distinctive appearances that correspond respectively to the plurality of available comment types;
wherein a first comment item in the plurality of comment items has a first particular time value that is at or after a current time value corresponding to a current point of play of the video program.

6. The method of claim 5 further comprising determining, during playing of the video program, that the current time value of the current point of play of the video program is greater than the first particular time value, and in response thereto, causing re-displaying the list with a new first comment item in the plurality of comment items that has a new first particular time value that is at or after the current time value corresponding to the current point of play of the video program.

7. The method of claim 1, further comprising:
receiving taxonomy input data indicating a particular category in a taxonomy;
creating and storing, in the record, the particular category in association with the identifier of the video program, the time value, the comment input, and the particular category.

8. The method of claim 7 wherein the taxonomy is any of a framework and a rubric configured for use in evaluating an effectiveness of an educator.

9. The method of claim 1, further comprising:
receiving category input indicating a selection of a particular category from among a plurality of categories in a taxonomy;
storing, in a data repository, a record comprising at least an identifier of the video recording, the input data, the comment input, and the category input;
receiving query input identifying the particular category;
causing displaying a count of all records in the data repository that are associated with category input matching the query input.

10. The method of claim 1 wherein receiving the comment input data comprises receiving any of text, a video resource or video file, or an audio resource or audio file.

11. The method of claim 1, further comprising:
repeating the process of claim 1 a plurality of times and storing a plurality of different comment input data, each associated with a particular taxonomy and a particular category of the taxonomy;
receiving taxonomy input specifying the particular taxonomy and the particular category of the taxonomy;
generating and causing displaying a compilation video comprising a compilation of a plurality of individual clips from the video program, wherein each of the clips is associated with a different item of the comment input data that matches the particular taxonomy and category.

12. A data processing system, comprising:
one or more processors;
one or more non-transitory computer-readable storage media coupled to the one or more processors and storing one or more sequences of instructions which when executed cause performing:
a first computer obtaining access to a digitally stored video program and causing playing the video program in a player window of a second computer, wherein the player window includes a linear graphical timeline representing the video program;
the first computer receiving from the second computer, input data specifying a point in the video program and determining a time value of the point in the video program;
receiving comment type input data from the second computer indicating a particular comment type among a plurality of available comment types;
wherein each comment type of the plurality of available comment types indicates a general substance of a comment;
receiving comment input data from the second computer;
creating and storing, in electronic digital storage coupled to the first computer, a record that associates an identifier of the video program, the time value, the comment type input data, and the comment input data;
causing displaying, in the timeline, at a position that is proportional to the point, a marker having a particular distinctive appearance from among a plurality of distinctive appearances that correspond respectively to the plurality of available comment types;
the first computer causing playing the video program in a second player window of a third computer, wherein the second player window includes a second linear graphical timeline representing the video program, wherein the second computer is different than the third computer;
the first computer receiving from the third computer, second input data specifying a second point in the video program and determining a second time value of the second point in the video program;

receiving second comment type input data from the third computer indicating the particular comment type;

receiving second comment input data from the third computer;

creating and storing, in the electronic digital storage coupled to the first computer, a second record that associates a second identifier of the video program, the second time value, the second comment type input data, and the second comment input data;

causing displaying, in the second timeline, at a second position that is proportional to the second point, a second marker having the particular distinctive appearance from among the plurality of distinctive appearances that correspond respectively to the plurality of available comment types and, at the position that is proportional to the point, the marker.

13. The data processing system of claim 12 wherein the plurality of distinctive appearances comprises a plurality of different colors, wherein the storage media comprise sequences of instructions which when executed cause displaying the marker using a particular color that corresponds to the particular comment type.

14. The data processing system of claim 12 wherein the storage media comprise sequences of instructions which when executed cause displaying, in association with the player window, a plurality of count values, in which each of the count values is associated with one of the available comment types and indicates a total number of records in the storage that include comment type input data corresponding to the associated one of the available comment types.

15. The data processing system of claim 12 wherein the storage media comprise sequences of instructions which when executed cause displaying a comment item in a scrolling reverse chronological list of a plurality of comment items, wherein the comment item comprises the time value, the comment input data, and a graphical icon having a particular distinctive appearance from among a plurality of distinctive appearances that correspond respectively to the plurality of available comment types.

16. The data processing system of claim 12 wherein the storage media comprise sequences of instructions which when executed cause:

displaying, near the player window, a scrolling reverse chronological list of a plurality of comment items;

wherein each comment item in the plurality of comment items is for a previously entered annotation and comprises a particular time value, particular comment input data, and a particular graphical icon having a particular distinctive appearance from among a plurality of distinctive appearances that correspond respectively to the plurality of available comment types;

wherein a first comment item in the plurality of comment items has a first particular time value that is at or after a current time value corresponding to a current point of play of the video program.

17. The data processing system of claim 16 wherein the storage media comprise sequences of instructions which when executed cause determining, during playing of the video program, that the current time value of the current point of play of the video program is greater than the first particular time value, and in response thereto, causing re-displaying the list with a new first comment item in the plurality of comment items that has a new first particular time value that is at or after the current time value corresponding to the current point of play of the video program.

18. The data processing system of claim 12, wherein the storage media comprise sequences of instructions which when executed cause:

receiving taxonomy input data indicating a particular category in a taxonomy;

creating and storing, in the record, the particular category in association with the identifier of the video program, the time value, the comment input, and the particular category.

19. The data processing system of claim 18 wherein the taxonomy is any of a framework and a rubric configured for use in evaluating an effectiveness of an educator.

20. The data processing system of claim 12, wherein the storage media comprise sequences of instructions which when executed cause:

receiving category input indicating a selection of a particular category from among a plurality of categories in a taxonomy;

storing, in a data repository, a record comprising at least an identifier of the video recording, the input data, the comment input, and the category input;

receiving query input identifying the particular category;

causing displaying a count of all records in the data repository that are associated with category input matching the query input.

21. The data processing system of claim 12 wherein the storage media comprise sequences of instructions which when executed cause receiving the comment input data comprises receiving any of text, a video resource or video file, or an audio resource or audio file.

* * * * *